United States Patent
Baumgarten et al.

(10) Patent No.: US 12,052,320 B2
(45) Date of Patent: Jul. 30, 2024

(54) SOFTWARE FRAMEWORK FOR PROGRESS TRACKING IN A CLASSROOM SETTING

(71) Applicant: Apple Inc., Cupertino, CA (US)

(72) Inventors: John S. Baumgarten, San Jose, CA (US); Jennifer U. Song, San Francisco, CA (US); Marin Eubanks, Santa Clara, CA (US); Pavel V. Dudrenov, San Francisco, CA (US); Sugam Jain, San Francisco, CA (US); Leo Lee, San Jose, CA (US); Saman Vafaee, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 16/258,161

(22) Filed: Jan. 25, 2019

(65) Prior Publication Data
US 2019/0297155 A1 Sep. 26, 2019

Related U.S. Application Data

(60) Provisional application No. 62/648,361, filed on Mar. 26, 2018.

(51) Int. Cl.
*H04L 67/50* (2022.01)
*G06F 8/70* (2018.01)
*G09B 5/14* (2006.01)

(52) U.S. Cl.
CPC .............. *H04L 67/535* (2022.05); *G06F 8/70* (2013.01); *G09B 5/14* (2013.01)

(58) Field of Classification Search
CPC ........ G06Q 50/20; H04L 67/22; H04L 51/046
See application file for complete search history.

(56) References Cited

U.S. PATENT DOCUMENTS 9,269,274 B1   2/2016  Hu
2006/0254432 A1 11/2006 McLemore
(Continued)

FOREIGN PATENT DOCUMENTS

CN    1808520 A    7/2006
CN  101657838 A    2/2010
(Continued)

OTHER PUBLICATIONS

International Patent Application No. PCT/US2019/021228—International Search Report and Written Opinion dated Jun. 20, 2019.
(Continued)

*Primary Examiner* — Oleg Survillo
*Assistant Examiner* — Christopher P Cadorna
(74) *Attorney, Agent, or Firm* — DICKINSON WRIGHT RLLP

(57) ABSTRACT

This application relates to a client-server architecture that enables progress tracking related to assignments generated by an instructor. A hand-out can include attachments that specify placeholders for hand-ins and/or activities to be performed by the student as part of the assignment. Some activities can be performed using third-party applications that implement at least a portion of a software framework that causes the applications to generate progress tracking information provided to a daemon executing in the background of a client device. The daemon and/or a client application interface with one or more network services to enable an instructor to utilize the progress tracking information. The network services can include a hand-out service utilized to generate hand-outs assigned to a group of students. The network services can also include a progress pipeline including a number of services configured to pro- (Continued)

cess progress tracking information received from a plurality of client devices.

20 Claims, 24 Drawing Sheets

(56) References Cited

U.S. PATENT DOCUMENTS

| | | | |
|---|---|---|---|
| 2007/0122790 A1 | 5/2007 | Sperle et al. | |
| 2008/0254432 A1 | 10/2008 | Woolf et al. | |
| 2008/0261191 A1 | 10/2008 | Woolf et al. | |
| 2009/0035733 A1 | 2/2009 | Meitar et al. | |
| 2009/0198542 A1 | 8/2009 | D Amore et al. | |
| 2013/0344462 A1* | 12/2013 | Clarke | G09B 19/02 434/188 |
| 2014/0099624 A1 | 4/2014 | Dohring et al. | |
| 2014/0122595 A1 | 5/2014 | Murdoch et al. | |
| 2014/0272889 A1 | 9/2014 | Kulkarni et al. | |
| 2014/0344175 A1* | 11/2014 | Kapoor | G06Q 10/1053 705/321 |
| 2015/0199910 A1* | 7/2015 | Patel | G09B 5/08 434/362 |
| 2015/0206448 A1* | 7/2015 | Loudermilk | H04L 67/22 434/308 |
| 2015/0235564 A1 | 8/2015 | Lynch | |
| 2015/0269857 A1* | 9/2015 | Feng | G09B 7/00 434/353 |
| 2016/0012742 A1* | 1/2016 | Lee | A63F 13/92 434/362 |
| 2016/0027318 A1 | 1/2016 | Rao | |
| 2016/0321937 A1 | 11/2016 | Alrouqi | |
| 2017/0084184 A1* | 3/2017 | Yadav | G09B 19/00 |
| 2017/0193835 A1 | 7/2017 | Bonney-Ache et al. | |
| 2018/0075766 A1* | 3/2018 | Martin | H04L 12/185 |
| 2018/0247562 A1* | 8/2018 | Downs | G09B 19/0053 |
| 2018/0261117 A1* | 9/2018 | Levinson | G06F 16/435 |
| 2018/0374374 A1* | 12/2018 | Watson | G09B 5/14 |
| 2019/0318644 A1* | 10/2019 | Aleem | G09B 5/02 |

FOREIGN PATENT DOCUMENTS

| | | | |
|---|---|---|---|
| CN | 104603827 | A | 5/2015 |
| CN | 105405081 | A | 3/2016 |
| CN | 105513443 | A | 4/2016 |
| CN | 105574630 | A | 5/2016 |
| JP | 2004070233 | A | 3/2004 |
| JP | 2007264027 | A | 10/2007 |
| JP | 2010535351 | A | 11/2010 |
| KR | 20120123703 | A | 11/2012 |
| KR | 101319666 | B1 | 10/2013 |
| WO | 9822864 | A1 | 5/1998 |

OTHER PUBLICATIONS

European Patent application 19776533.2—Extended European Search Report dated Aug. 4, 2021.
Japanese Patent Application No. 2020-545163—Office Action dated Sep. 13, 2021.
Korean Patent Application No. 10-2020-7024265—Notice of Preliminary Rejection dated Jul. 15, 2022.
Toshiyasu Kato et al., Realization of Functions of Assessing Learning Conditions in Learning Management Systems for Programming Practicum, IPSJ Articles vol. 55 No.8 Online, Japan, IPSJ, Aug. 15, 2014, pp. 1918-1930.
Japanese Patent Application No. 2022-007219—Office Action dated Feb. 13, 2023.
Australian Patent Application No. 2022203160—Second Office Action dated Jan. 15, 2024.
Chinese Patent Application No. 201980016106.1—First Office Action dated Mar. 22, 2024.

* cited by examiner

SOFTWARE FRAMEWORK FOR PROGRESS TRACKING IN A CLASSROOM SETTING

CROSS-REFERENCE TO RELATED APPLICATIONS

The present application claims the benefit of U.S. Provisional Application No. 62/648,361, entitled "SOFTWARE FRAMEWORK FOR PROGRESS TRACKING IN A CLASSROOM SETTING," filed Mar. 26, 2018, the content of which is incorporated herein by reference in its entirety for all purposes.

FIELD

The described embodiments relate generally to a software framework configured to implement various techniques in a classroom setting. More particularly, the present embodiments relate to tracking and reporting information related to progress of completion of online assignments for a plurality of students.

BACKGROUND

Ever since the invention of audio visual (AV) devices such as televisions, projection systems, and tape decks, school districts and instructors have been incorporating materials into their lesson plans that utilize these devices to provide information to students in new and engaging ways. Instructors were not merely limited to textbooks, lectures, and written assignments. With the advent of the information age, the Internet has opened new horizons in the classroom. Instructors can now draw from a nearly unlimited resource of information in order to create interactive lesson plans that are engaging and productive.

However, the tools available to instructors when developing these lesson plans are limited. For example, a Wikipedia® article may provide useful background material on a particular subject. Nevertheless, the instructor may not have a good option to share the article with their students. The instructor could print out the article on paper hand-outs, which was the traditional way to distribute such materials to students. However, this method is wasteful and loses some of the interactive elements (e.g., animations, hyperlinks, etc.) of the article as presented online. Alternatively, the instructor could email a hyperlink for the article to each of their students to view on a computing device at home or provided by the school. While such methods allow the students to view the article within the proper context to interact with the interactive elements embedded within the article, there is no way for the instructor to track whether each student clicked on the hyperlink or even whether each student actually read through the entire article.

SUMMARY

This paper describes various embodiments that relate to a client-server architecture that enables progress tracking related to assignments generated by an instructor. A hand-out can include attachments that specify placeholders for hand-ins and/or activities to be performed by the student as part of the assignment. Some activities can be performed using third-party applications that implement at least a portion of a software framework that causes the applications to generate progress tracking information provided to a daemon executing in the background of a client device. The daemon and/or a client application interface with one or more network services to enable an instructor to utilize the progress tracking information. The network services can include a hand-out service utilized to generate hand-outs assigned to a group of students. The network services can also include a progress pipeline including a number of services configured to process progress tracking information received from a plurality of client devices.

In some embodiments, a client device includes a processor, a memory, and a display. The memory can include an operating system, a client application, a daemon, and one or more third-party applications, such applications including at least one progress application that implements at least a portion of a software framework. The software framework enables the progress application to generate progress tracking information related to one or more contexts the progress application provides to the client application and/or the daemon. A context generally defines a structure of at least a portion of the progress application such that the client application can define activities that can be completed by a student within the progress application.

In some embodiments, the daemon is executed as a background process and is configured to receive progress tracking information from one or more applications, filter the progress tracking information, store the progress tracking information in a remote database, generate metadata associated with the progress tracking information, and transmit the metadata to at least one service. The daemon can also implement a syncing mechanism that coordinates versions of a resource stored locally on the client device with versions stored in a remote database. The syncing mechanism enables the resource to be accessed on two or more client devices.

In some embodiments, the software framework causes the progress applications to generate API calls transmitted to the daemon that include progress tracking information. The daemon can be configured to filter the progress tracking information based on whether progress tracking is enabled or disabled for the one or more progress applications. Alternately, the daemon can be configured to filter the progress tracking information based on a list of active contexts.

In some embodiments, the remote database is a network-based storage service apportioned into a plurality of zones storing different data, each zone limited in scope to any combination of at least one of an organization identifier, a class identifier, a user identifier, a context identifier, or a hand-out identifier. Metadata corresponding to the progress tracking information is generated by the daemon and transmitted to a progress pipeline. The metadata includes a reference to the progress tracking information in the remote database as well as at least one of a class identifier, a hand-out identifier, a user identifier, or a context identifier.

In some embodiments, the progress pipeline includes a number of services structured in a pipeline architecture. The progress pipeline can include an on-ramp service configured to: receive metadata corresponding to progress tracking information; de-reference a user identifier included in the metadata by replacing the user identifier with a directory service identifier or an internal identifier; determine whether progress tracking is enabled or disabled for one of the user identifier, the directory service identifier, or the internal identifier; and filter the metadata based on the determining. The progress pipeline can include an enrichment service configured to: enrich the metadata with at least one of an organization identifier, a directory service identifier, a user identifier, or a hand-out identifier. The progress pipeline can include an aggregator service configured to: retrieve a subset of metadata corresponding with a tracking window from a distributed file system that includes at least one journal node, generate a data structure that includes the subset of metadata associated with a particular organization identifier included in the subset of metadata, store the data structure in a memory, and push a reference corresponding to the data structure into a queue. The progress pipeline can include an off-ramp service configured to: process a data structure to generate sorted metadata based on at least one of a class identifier, a hand-out identifier, a context identifier, the user identifier, the directory service identifier, or the internal identifier. The progress pipeline can include a deposit service configured to: associate the progress tracking information with a progress identifier associated with one of the user identifier or the directory service identifier; and store the progress tracking information and the progress identifier in a network-based storage service.

The client-server architecture and/or the software framework, individually or in combination, can enable instructors and students to interact using interactive lesson plans that incorporate functionality of one or more third-party applications to enhance the learning experience. Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
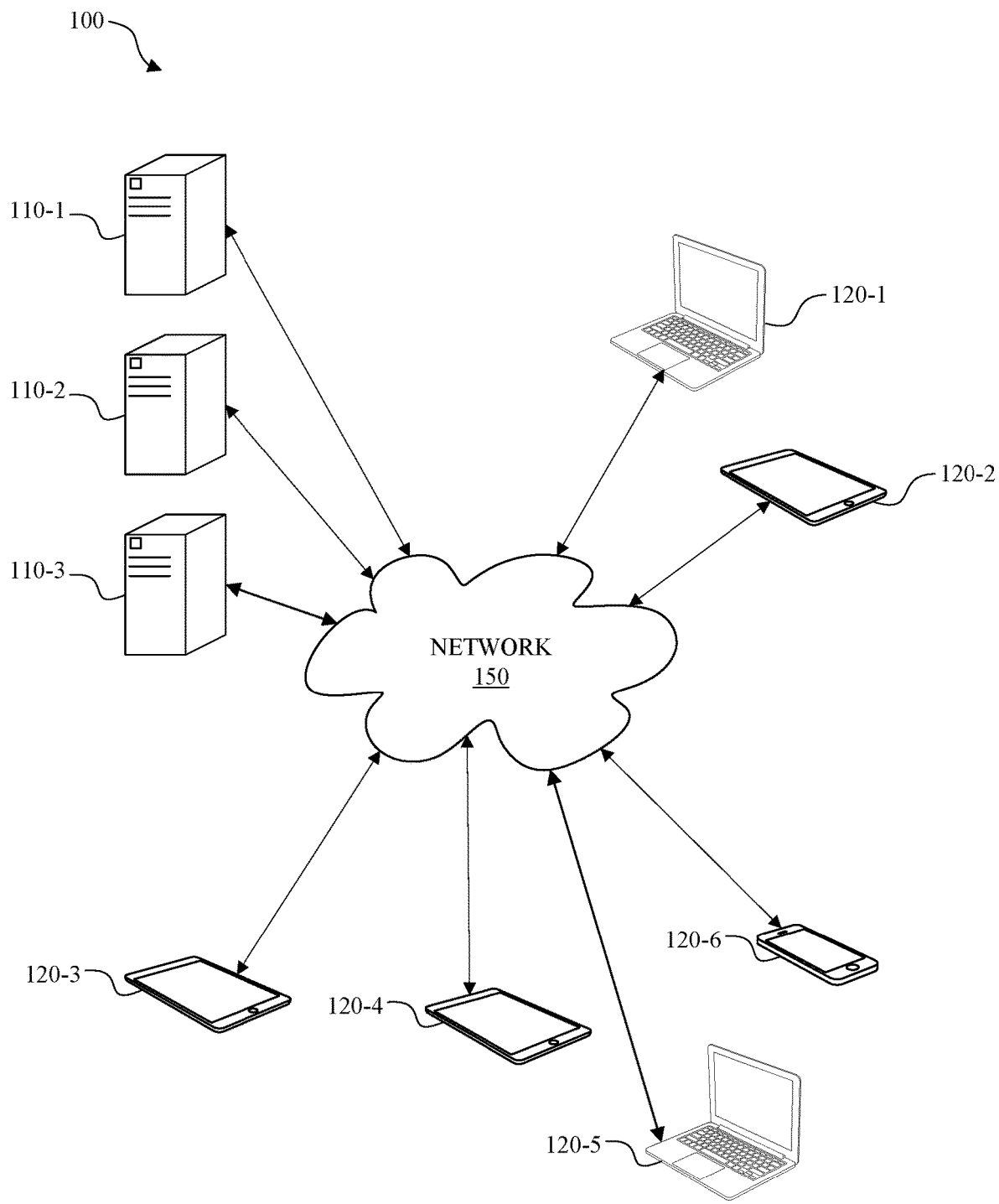
FIG. 1 illustrates a network environment designed to operate within a classroom setting, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The digital classroom provides students with new opportunities to learn within a rich environment of interactive applications installed on computing devices provided to the students. While devices can allow students to interact with information online that is accessed through a browser or provided through specialized applications, the benefits to these activities are usually lost due to the difficult nature of tracking these activities. Consequently, new techniques for incorporating these materials into a unified classroom architecture is desired.

A classroom setting can provide instructors and students with a number of devices and applications that enable the instructor to assign the students activities using these applications that can be monitored easily by the instructor. An instructor creates hand-outs to assign to the students that incorporate activities defined by contexts provided by one or more third-party applications that implement a software framework. The third-party applications are configured to track a progress of students completing activities associated with these contexts and provide progress tracking information to a background process of the device. The background process and/or a client application can interface with one or more network services designed to process the progress tracking information. The processed progress tracking information can be queried to generate report data to display to an instructor that shows a progress of each of the students assigned the hand-out.

These and other embodiments are discussed below with reference to FIGS. 1-17; however, those skilled in the art will readily appreciate that the detailed description given herein with respect to these figures is for explanatory purposes only and should not be construed as limiting.

FIG. 1 illustrates a network environment 100 designed to operate within a classroom setting, in accordance with some embodiments. The network environment 100 includes a number of separate and distinct computing devices configured to communicate over a network 150. The network environment 100 includes server devices 110 and client devices 120. As shown in FIG. 1, the client devices 120 can include, but are not limited to, laptop computers 120-1 and 120-5, tablet computers 120-2, 120-3, and 120-4, and mobile devices 120-6. It will be appreciated that the network environment 100 can include other types of client devices 120 such as desktop computers, wearable devices (e.g., smart watches), personal digital assistants, and the like.

The following terms may be used throughout this paper. A class refers to a group of individuals who meet regularly to be taught a particular subject or activity. The class can include one or more instructors and a number of students enrolled in the class. A classroom setting refers to a group of related devices utilized by a group of users associated with a class. A school refers to an administrative collection of a number of classes taught by a group of instructors. A school district refers to an organization that manages one or more schools.

In some embodiments, an instructor utilizes one or more devices to disseminate materials to students within a class. As shown in FIG. 1, the instructor can utilize a laptop computer such as client device 120-1 or a tablet computer such as client device 120-2 to create materials for the students. In some embodiments, the laptop computer and/or the tablet computer include applications configured to create interactive assignments for the students. The assignments can include links to materials available over the network 150, such as hyperlinks to websites available from a first server device 110-1 or documents stored on a second server device 110-2. The applications can also enable the instructor to easily distribute the assignments to the students. The students can utilize the tablet computers such as client device 120-3 and 120-4, the laptop computer such as client device 120-5, and/or the mobile device such as client device 120-6 to access the assignments and view the materials included in each assignment.

In some embodiments, a third server device 110-3 hosts one or more services utilized by the applications included on the various client devices 120. For example, the third server device 110-3 can host a service for uploading data structures or files that define an assignment to a network-based storage resource. As another example, the third server device 110-3 can host a service that tracks which client devices 120 are registered to a particular classroom setting. As yet another example, the third server device 110-3 can host a service that tracks a progress of each student corresponding with a particular assignment. In some embodiments, services utilized by the application(s) can be hosted on more than one server device 110. In addition, the services can be hosted by different service providers. For example, a first server device 110—maintained by a first service provider can be configured to host a network-based storage service, and a second server device 110-2 maintained by a second service provider can be configured to host a school management service.

A description of a software framework for applications executed by the various client devices 120 within the classroom setting is set forth below. In addition, a description of various services utilized by the applications described herein and hosted on one or more server device 110 is set forth below.

Figure 2:
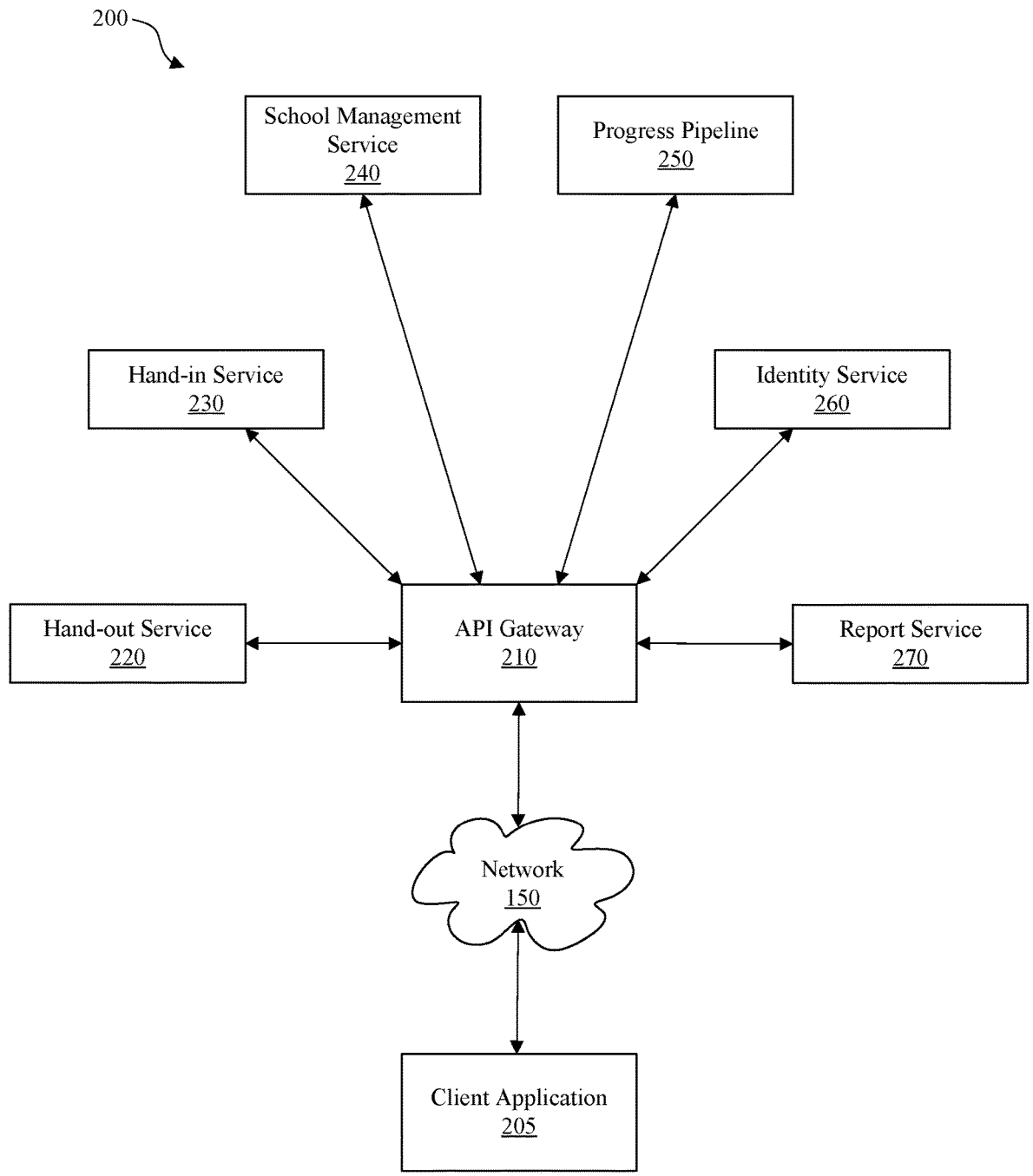
FIG. 2 illustrates a client-server architecture implemented to enable progress tracking for client devices in the classroom setting, in accordance with some embodiments.

FIG. 2 illustrates a client-server architecture 200 implemented to enable progress tracking for client devices 120 in the classroom setting, in accordance with some embodiments. The client-server architecture 200 includes a client application 205 implemented on a client device 120 and configured to interact with a number of services implemented on server devices 110 accessible over the network 150. The client-server architecture 200 enables instructors to create assignments that include rich interactive materials provided by one or more third-party applications installed on the client device 120 as well as integrate seamless tracking of progress such that an instructor can monitor the students' effort at keeping abreast of the assignments in a class.

In some embodiments, the client application 205 is a binary executable configured to be executed by a processor included in the client device 120. The binary executable can be designed to work within a particular operating environment, such as a target hardware platform designed to execute a target operating system. Consequently, the client application 205 can be implemented using multiple versions of the source code compiled for different operating environments. For example, a first version of the client application 205 can be designed for a laptop computer 120-1 and a second version of the client application 205 can be designed for a tablet computer 120-2.

In some embodiments, the client application 205 is designed to connect with one or more services over the network 150. The services can include, but are not limited to, a hand-out service 220, a hand-in service 230, a school management service 240, a progress pipeline 250, an identity service 260, and a report service 270. The client application 205 can be configured to access a service via an application programming interface (API) implemented by the service. For example, a web-based service can implement an API using a simple object access protocol (SOAP) or a representational state transfer protocol (REST) that enables the client application 205 to access and/or operate on resources associated with the service. The API can enable the client application 205 to transmit data to and/or receive data from the service. API calls can also cause the service to perform various operations and/or call additional services using additional API calls.

In other embodiments, the client application 205 is a web-based application displayed within a browser of a client device 120. The client application 205 can include a series of resources (e.g., hypertext markup language (HTML) documents, images, scripts, etc.) requested from a server associated with a website. The browser receives the resources and interprets the resources to display a representation of the website on a display of the client device 120. The client application 205 is therefore platform-independent in that the client application 205 can be displayed on a plurality of different client devices 120 running different operating systems.

In some embodiments, the client application 205 interfaces with the one or more services through an API gateway 210. The API gateway 210 is implemented by a server device 110 and redirects API calls received from client devices 120 to the various services in the client-server architecture 200. In other embodiments, the API gateway 210 is omitted or selectively bypassed and the client devices 120 transmit API calls to the services directly.

In some embodiments, the client application 205 enables an instructor to create hand-outs for a class. A hand-out refers to a file or data structure that includes information related to an assignment intended to be published to students within the class. The hand-out can include a number of fields including: a hand-out identifier, a title of the assignment, a body of the assignment that includes text-based instructions for the students on how to complete the assignment, a due date for the assignment, and a list of attachments associated with the assignment. The hand-outs can be created and stored locally on a particular client device 120. The attachments can include files (e.g., documents, images, videos, etc.), placeholders for a file the student is to turn in, and activities the student is to complete as part of the assignment. The activities are performed using third-party applications that implement a portion of a class kit software framework. Examples of activities can include, but are not limited to, reading a chapter of a digital book or textbook, taking a quiz or answering a set of problems, tracking time spent performing a task such as playing an interactive game or performing a digital experiment, and so forth.

In some embodiments, the client-server architecture 200 includes a hand-out service 220. The hand-out service 220 is configured to manage hand-outs. In some embodiments, the hand-out service 220 is configured to sync hand-outs created on one client device 120 with another client device 120 to enable an instructor to work on multiple devices. In some embodiments, the hand-out service 220 is configured to enable the hand-outs to be published to a list of students. Publishing a hand-out refers to making the information in the hand-out available to be viewed by the students on a separate client device 120 as well as handling various back-end operations related to the attachments for the hand-outs.

In some embodiments, the client-server architecture 200 can also include a hand-in service 230. A hand-in refers to a placeholder for a file or data structure, which indicates that a student is instructed to create a file or data structure to turn in in order to complete the assignment. A student can create the file or data structure and submit the file or data structure to the hand-in service 230 to satisfy the requirement for completing the assignment.

In some embodiments, the client-server architecture 200 can also include a school management service 240 configured to manage administrative information for a school district related to the structure of classes. For example, the school management service 240 can maintain records that indicate which instructors are assigned to each of a plurality of classes. The records can also indicate which students are enrolled in each of the plurality of classes. Each instructor or student can be assigned an instructor identifier or a student identifier, respectively. Each class created by the school district can be associated with a class identifier. A separate record can then be created for each class identifier that lists a roster of student identifiers for students enrolled in the class. In some embodiments, a relational database associates instructor identifiers and/or student identifiers with class identifiers in one or more tables. The relational database can be queried using Structured Query Language (SQL) or some other type of query language to return information that identifies the structure of various classes.

In some embodiments, the school management service 240 includes an administrative interface that enables an administrator for a school district to create classes and specify the students enrolled in the class. The administrative interface can be, e.g., a web-based interface requiring the administrator to provide credentials in order to change the rosters for each class. In other embodiments, the school management service 240 includes an interface to download data from a separate and distinct school information system that the school district maintains separately from the client-server architecture 200. The classes and rosters can be automatically downloaded from the school information system.

In some embodiments, the client-server architecture 200 can also include a progress pipeline 250. The progress pipeline 250 provides a secure architecture for managing information related to progress tracking as students complete the assignments described in the hand-outs published by the instructors. The client devices 120 of the students can include a background process (i.e., a daemon) configured to monitor activities related to one or more third-party applications installed on the client devices 120. The daemon tracks progress made by the students in completing the assignments specified in one or more published hand-outs and transmits information related to the progress of each student to the progress pipeline 250. The progress pipeline 250 aggregates and stores the progress information to enable the instructor to view comprehensive reports for one or more students in a class.

In some embodiments, the progress pipeline 250 is implemented as a number of separate services executing on different server devices 110 and structured to process progress information in a dataflow in a pipelined manner. In other embodiments, the progress pipeline 250 can be implemented with a number of services executing on a single server device 110.

In some embodiments, the client-server architecture 200 can also include an identity service 260. The identity service 260 enables data related to particular client devices 120 to be associated with particular people (e.g., instructors or students) within the classroom setting. In some embodiments, the identity service 260 associates various user identifiers or device identifiers with a directory service identifier limited in scope to the server-side of the client-server architecture 200. The use of the identity service 260 protects the integrity of data by disassociating personally identifying information collected by the daemon from any identifiers that are utilized outside of a specific scope (e.g., the classroom setting). Thus, data like how a user scores on tests cannot be tied to other information outside of said scope like what kind of music a student likes to listen to on a music-sharing service offered by the same service provider. The integrity of such personally identifying information can be particularly important given that most students are minors and there may be special considerations taken into account when protecting the data of vulnerable users of a certain age.

In some embodiments, the directory service identifier is a static identifier associated with a user of one or more device by a particular service provider. The directory service identifier can be associated with a user identifier used by the client device to associate a user with a particular user account. The directory service identifier can be associated with an external identifier associated with the user of a particular user account and exposed to the client devices. The directory service identifier can be associated with an internal identifier for a particular user. The internal identifier can be disassociated from the directory service identifier and a new internal identifier can then be associated with the directory service identifier. In some embodiments, replacing the internal identifier with a new internal identifier can be utilized to break an association between certain stored data and a particular user or user account without having to delete said data from one or more server devices 110.

In some embodiments, the client-server architecture 200 can also include a report service 270 that enables aggregated data related to the progress of activities completed by a number of students to be compiled and provided to a client device 120 to be reviewed by an instructor. The report service 270 can also analyze the progress information received from a plurality of students in order to generate statistical data related to the progress information. For example, the report service 270 can generate statistics related to how many students have completed a particular activity. The report service 270 can also track results related to activities (e.g., number of correctly answered questions from a quiz activity, a time to complete the quiz, etc.). In other embodiments, the client application 205 receives report data on individual students from the report service 270, and the client application 205 aggregates the report data and/or calculates the statistics for the class.

It will be appreciated that the client application 205 can be configured to interact with some or all of the described services in the client-server architecture 200. For example, the client application 205 can be configured to generate calls to the hand-out service 220, the hand-in service 230, the progress pipeline 250, and the report service 270. In some embodiments, the client application 205 is not configured to interact with a subset of the services, such as the school management service 240 and/or the identity service 260. Instead, other services can generate calls to these services in response to receiving a call from the client application 205.

Figure 3:
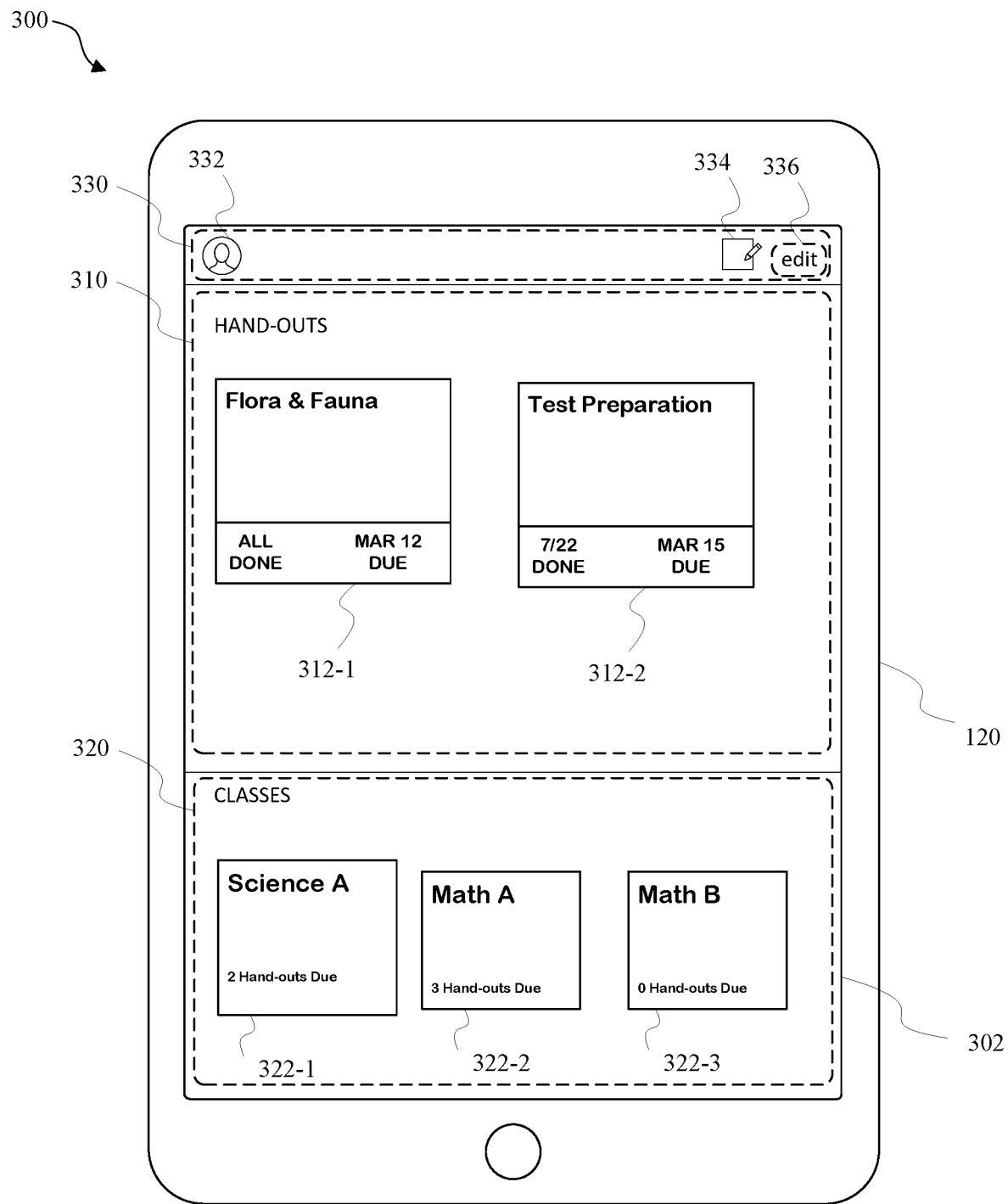
FIG. 3 illustrates a graphical user interface of the client application, in accordance with some embodiments.

FIG. 3 illustrates a GUI 300 of the client application 205, in accordance with some embodiments. The GUI 300 can be presented to an instructor on a display 302 of the client device 120. As shown in FIG. 3, the GUI 300 is displayed on a tablet computer, such as client device 120-2. The GUI 300 can include a number of elements including graphics, text, icons, shapes, input fields, output fields, display regions, etc.

In some embodiments, the GUI 300 includes a first display region 310, a second display region 320, and a third display region 330. The first display region 310 is utilized to display representations of a hand-out previously created by an instructor. The second display region 320 is utilized to display representations of classes associated with a particular instructor. As shown in FIG. 3, the first display region 310 occupies a first portion of the pixels included in the display 302, and the second display region 320 occupies a second portion of the pixels included in the display 302.

The first display region 310 includes a header that indicates elements 312 represent separate and distinct hand-outs associated with a user account. The hand-outs can be created by instructors, administrators, or accounts associated with other roles. In some embodiments, each element 312 is defined by a box that includes a title of the hand-out, a descriptor for a due date associated with the hand-out, and an indication of how many students have completed the hand-out. For example, a first element 312-1 is associated with a first hand-out for a "Flora & Fauna" assignment, which has a due date of March 12 and has been completed by all of the students; and a second element 312-2 is associated with a second hand-out for a "Test Preparation" assignment, which has a due date of March 15 and has only been completed by seven out of twenty-two students assigned the hand-out. It will be appreciated that, in other embodiments, the elements 312 can take different forms. For example, the elements 312 can omit the due date and/or completion indicator. Alternately, the elements 312 can include information in addition to or in lieu of the due date and/or the completion indicator. Additionally, the elements 312 can include graphics such as an image or icons representing different activities assigned in the hand-out. In some cases, the graphics can be animated, such as, by playing a video or showing a slide show of images attached to the hand-out as a background of the element 312.

The second display region 320 includes a header that indicates elements 322 represent separate and distinct classes associated with a user account for a particular instructor. In some embodiments, each element 322 is defined by a box that includes a title of the class and a descriptor for a number of hand-outs assigned to the class. For example, a first element 322-1 is associated with a "Science A" class, which has two hand-outs assigned; a second element 322-2 is associated with a "Math A" class, which has three hand-outs assigned; and a third element 322-3 is associated with a "Math B" class, which has zero hand-outs assigned. It will be appreciated that, in other embodiments, the elements 322 can take different forms. For example, the elements 322 can omit an indicator for the number of hand-outs assigned to a class. Alternately, the elements 322 can include information in addition to or in lieu of the title of the class and the indicator for the number of hand-outs assigned to the class. For example, the elements 322 can include a number of students enrolled in the class. Additionally, the elements 322 can include graphics such as an image or a background color coded to indicate a particular subject or department related to the class.

In some embodiments, an instructor can select a particular class (or multiple classes) using an input interface of the client device 120. For example, an instructor can use a touch interface to select an element 322 associated with one of the available classes associated with the instructor. Upon selection of a particular element 322, the selected element 322 is activated and the elements 312 in the first display region 310 may be updated to reflect the hand-outs associated with the class represented by the selected element 322 in the second display region 320. A selected element 322 (e.g., the currently activated element) can be highlighted to indicate the element 322 is active. Highlighting can be implemented by increasing the size of the element, changing a color associated with the element 322 or changing the color or weight of a border of the element 322, displaying a box around the selected element 322, and so forth. As shown in FIG. 3, the first element 322-1 is activated and shown as larger than the second element 322-2 and the third element 322-3.

It will be appreciated that, in some embodiments, there may be insufficient room within the first display region 310 and/or the second display region 320 to present all of the classes and/or all of the hand-outs assigned for a particular class within the extents of the display 302. In such cases, the user of the client device 205 can use input commands, such as touch gestures, to display additional elements. For example, an icon can be displayed that indicates some elements are not displayed. The additional elements will be displayed in the first display region 310 or the second display region 320 responsive to a user selecting the icon. In another example, a user can use a swipe touch gesture to scroll horizontally to display additional elements while other elements are moved within or removed from the particular display region.

A third display region 330 is located proximate a top edge of the display 302. The third display region 330 includes elements that enable a user of the client application 205 to sign-in to a user account, generate new handouts for a particular class, or edit previously generated hand-outs stored locally on the client device 120 and/or remotely on a server device 110. In some embodiments, the third display region 330 is hidden and can be displayed responsive to a user input, such as by using a vertical swipe touch gesture to cause the third display region 330 to be unhidden.

A first icon 332 is displayed proximate a left side of the third display region 330. The first icon 332, when selected by a user, can cause the client application 205 to prompt a user to enter credentials to sign-in to a user account associated with an instructor. In some embodiments, the first display region 310 and the second display region 320 are hidden until a user signs into a particular user account using the first icon 332. In some embodiments, upon launch of the client application 205, a separate interface is displayed to the user that prompts the user to enter credentials to sign-in to a user account. The GUI 300 is only displayed on the display 302 once the user has successfully signed into a particular user account. The first icon 332 can then be used to sign-out of the user account and/or to sign-in to a different user account.

A second icon 334 is displayed proximate a right side of the third display region 330. The second icon 334, when selected by a user, can cause the client application 205 to generate a file or data structure in a file system of the client device 120 in order to store information related to a new hand-out. In some embodiments, the new file or data structure is automatically associated with the active class selected in the second display region 320. The instructor can then add information to the file or data structure using a different GUI, which is described in more detail below with reference to FIGS. 6A-6E.

A third icon 336 is displayed proximate the right side of the third display region 330. The third icon 336, when selected by a user, can cause the client application 205 to retrieve information stored in a file or data structure for a previously-generated hand-out. In some embodiments, one of the elements 312 in the first display region 310 is activated, either automatically based on selection criteria or manually responsive to input provided by a user. For example, an element 312 can be selected automatically to be activated based on a smallest difference between the current date and a due date for a hand-out of all hand-outs stored for a particular class when the element 322 that represents the class is activated. Alternately, an element 312 can be selected manually to be activated in response to a touch gesture input (e.g., a tap input) in an area of the display 302 that corresponds to the particular element 312. Although not shown explicitly in FIG. 3, a selected element 312 within the first display region 310 (e.g., the currently activated element) can be highlighted to indicate the selected element 312 is active. Responsive to selecting the third icon 336, the different GUI, which is described in more detail below with reference to FIGS. 6A-6E, can be displayed by the client device 120 and populated with data from the file or data structure associated with the active element 312.

In some embodiments, the first display region 310 includes representations for hand-outs that are being prepared as well as hand-outs that have been published to a list of students. In some cases, the elements 312 can include an indication of whether the hand-out represented by the element 312 has been published or has yet to be published (i.e., is still being prepared by the instructor).

It will be appreciated that the GUI 300 described above and shown in FIG. 3 is merely an exemplary embodiment of a GUI designed for the client application 205. In other embodiments, the GUI for the client application 205 can take other forms. The look and feel of the GUI may also correspond to standard display elements associated with a particular operating system or target environment. Furthermore, in yet other embodiments, the client application 205 is a web-based application displayed in a browser of the client device 120. In such embodiments, the GUI 300 can include a plurality of Hypertext Markup Language (HTML) elements included in one or more HTML documents. The representation of such elements can depend on the implementation of the browser application in the client device 120 and, in some cases, user preferences associated with the browser application.

Figure 4:
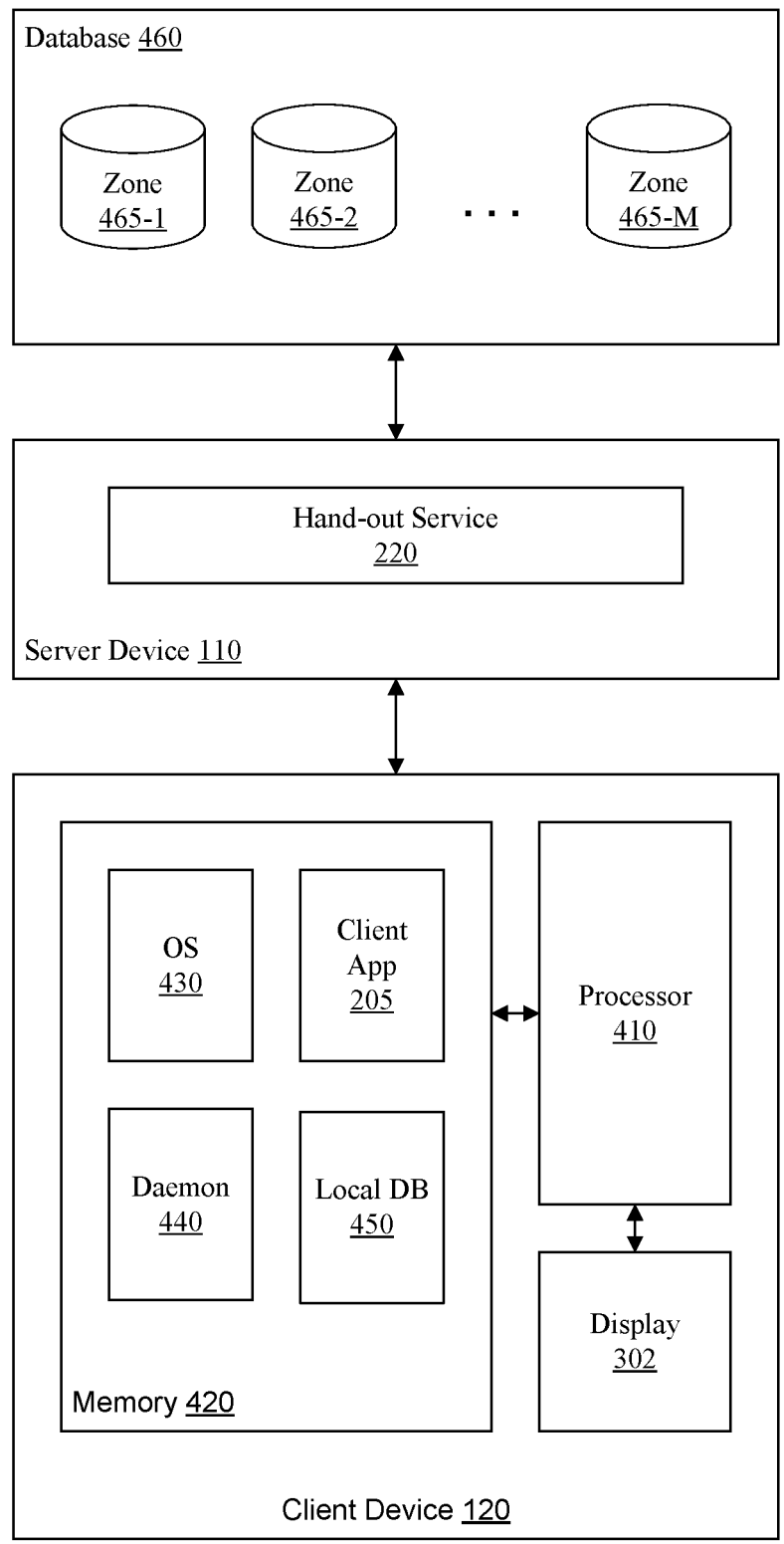
FIG. 4 illustrates a client-server relationship between the hand-out service and a client application and/or daemon, in accordance with some embodiments.

FIG. 4 illustrates a client-server relationship between the hand-out service 220 and a client application 205 and/or daemon 440, in accordance with some embodiments. The hand-out service 220 provides a means for an instructor to create and assign hand-outs to a list of students enrolled in a class associated with the instructor. As described above, the client application 205 is configured to prompt a user to provide credentials associated with a user account. If the user account is associated with an instructor, then the client application 205 enables the instructor to generate files or data structures for hand-outs within the memory 420 of the client device 120. In some embodiments, these files or data structures can be synced to a network-based storage service, which enables the instructor to access the information related to the hand-out from multiple client devices 120.

As shown in FIG. 4, a client device 120 includes a processor 410, a display 302, and a memory 420. The memory 420 includes an operating system 430, the client application 205, a daemon 440, and a local database 445. The daemon 440 is a background process that implements an API that enables the client application 205 to communicate asynchronously with the daemon 440 to perform certain tasks. One of those tasks operates to create a file in the local database 445.

In some embodiments, the daemon 440 maintains a local database 450. In some embodiments, an instructor can create a new file or data structure for a hand-out using the client application 205. The client application 205 requests the daemon 440 to create a file or data structure for the hand-out in the local database 450 maintained by the daemon 440. The instructor can populate the file or data structure for the hand-out using the GUI 600, discussed in more detail below with reference to FIGS. 6A-6E.

In some embodiments, the daemon 440 is configured to sync files or data structures in the local database 450 to a remote database 460. The remote database 460 can be a distributed database, such as a cloud-based database service, implemented on a number of server devices 110. The daemon 440 interfaces with the remote database 460 in order to sync the files or data structures in the local database 450 with remote versions of the files or data structures such that the files or data structures can be accessed and/or modified using multiple client devices 120. The syncing mechanism will be described in more detail below with reference to FIG. 5.

Once a hand-out has been synced to the remote database 460, the instructor can then switch to a different client device 120, using a different version of the client application 205, and access the version of the hand-out stored on the remote server 110 using the new client device 120. Any changes to a local copy of the resource stored on the new client device 120 will be synced to the remote database 460 to update the version of the hand-out on the remote database. These changes are then pushed to the client application 205 on the previous client device 120 to update a copy of the local resource in the local database 450 on the initial client device 120.

For example, an instructor can open a client application 205 on a laptop computer 120-1 and create a local version of a hand-out stored in a memory of the laptop computer 120-1. The daemon 440 on the laptop computer 120-1 transmits a copy of the local version of the hand-out to the remote database 460 to sync the hand-out with a version of the hand-out stored in the remote database 460. The instructor then opens a separate client application 205 on a tablet computer 120-2 and provides credentials for the instructor's user account. Opening the client application 205 on the tablet computer 120-2 causes the daemon 440 to download the remote version of the handout stored on the remote database 460 to a memory of the tablet computer 120-2, where the client application 205 on the tablet computer 120-2 can access the local copy of the hand-out and modify the local copy of the hand-out in the memory of the tablet computer 120-2. Any modifications to the local copy of the hand-out can be synced back to the remote database 460 such that the version of the hand-out stored on the remote database 460 is up to date. The next time the instructor opens the client application 205 on the laptop computer 120-1, the client application 205 will cause the daemon 440 to request a current version of the hand-out from the remote database 460, which transmits the version of the hand-out stored on the remote database 460 to the daemon 440 in the laptop computer 120-1 to store in the memory of the laptop computer 120-1 as the local version of the hand-out.

In some embodiments, the hand-out service 220 is implemented as a set of instructions, stored in a memory of a server device 110, which is configured to be executed by a processor of the server device 110. The hand-out service 220 manages distribution of hand-outs between client devices 120 associated with instructors and students. In some embodiments, the hand-out service 220 implements the distribution of hand-outs using the remote database 460. The hand-out service 220 creates zones 465 in the remote database 460. Each zone 465 is scoped to a particular class. Alternately, each zone 465 is scoped to a group of students. Each class associated with the instructor can be associated with a different group of students.

The instructor can create hand-outs in the local database 450 of a client device. The hand-outs are synced to a personal zone 465-1 for the instructor in the remote database 460. Once a particular hand-out is prepared and ready to be assigned to a group of students, the instructor can publish the hand-out utilizing the client application 205 to assign the hand-out to the group of students. The client application 205 requests the hand-out service 220 to publish the hand-out. The hand-out service 220 then causes a copy of the hand-out to be copied to a new zone 465-2 in the remote database 460 scoped to the group of students specified in the hand-out. Each of the students within the scope of the new zone 465-2 is subscribed to the new zone 465-2 such that a daemon 440 in a client device 120 controlled by each of the students in the group of students syncs the copy of the published hand-out to a local memory of the client device 120 for the student.

It will be appreciated that the hand-out service 220 also generates hand-out identifiers that can be utilized to identify the resource for the hand-out stored in the remote database 460. In some embodiments, a hand-out identifier is generated when the hand-out is published. In other embodiments, a hand-out identifier is generated when the hand-out is created. The resource for the hand-out is then copied to the new zone 465-2 and deleted from the personal zone 465-1 for the instructor when the hand-out is published.

Figure 5:
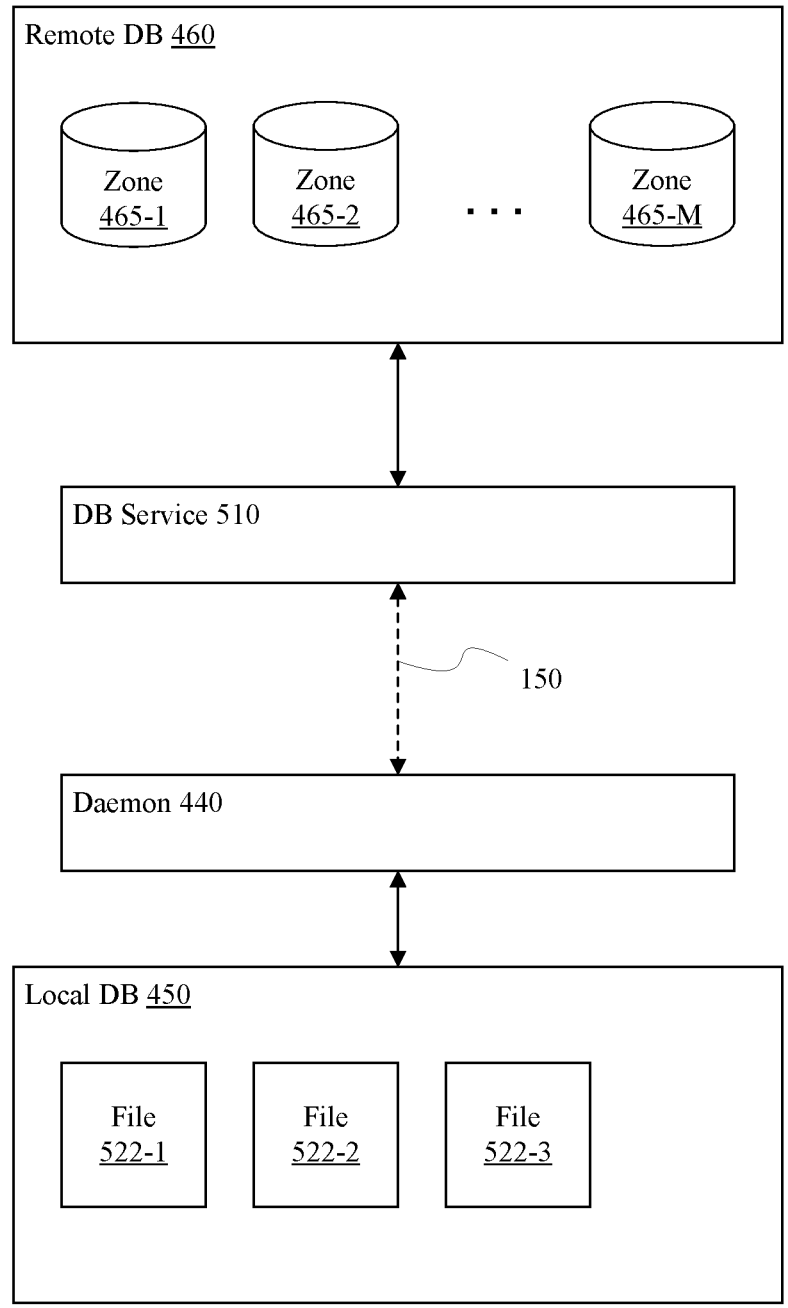
FIG. 5 illustrates a syncing mechanism implemented by the daemon, in accordance with some embodiments.

FIG. 5 illustrates a syncing mechanism implemented by the daemon 440, in accordance with some embodiments. As shown in FIG. 5, the daemon 440 is configured to interface, via a network 150, with a database service 510 that provides a front-end for the remote database 460. The database service 510 can be implemented on a server device 110. In some embodiments, the remote database 460 is restricted to the scope of a particular organization or school district. Thus, all of the information stored within a remote database 460 is for a particular school district. In such embodiments, the database service 510 is configured to manage multiple remote databases 460 for different organizations or school districts. In various embodiments, the remote database 460 is a cloud-based distributed database service managed by a service provider.

In some embodiments, the database service 510 is configured to store files in a plurality of different zones 465 implemented within the remote database 460. Each instructor and/or student in the school district can be assigned a different zone 465 as a personal zone within the remote database 460. The personal zones 465 can store files or data structures associated with a particular user account. In addition, each class created by the school district can be assigned a class zone 465 to share resources with all students and instructors associated with a class. In alternative embodiments, zones 465 can be created for groups of students and/or instructors that can be a subset of a class or enrolled in two or more classes. The class zones 465 can be utilized to publish hand-outs to students and/or other instructors associated with a particular class. Zones 465 can be scoped to an organization, a class, or an individual (e.g., an instructor or a student). Zones 465 can also be utilized for different data.

In some embodiments, the database service 510 maintains subscriptions for each zone 465 that indicate a list of users (e.g., instructors and/or students) within the scope of each zone 465. The database service 510 can push notifications to each of the client devices 120 for the users subscribed to a zone 465 whenever a resource within the zone 465 is updated. The daemon 440 on a particular client device 120 receives the notification and will download the updated resources from the zone 465 to update local copies of the resource 522 in the local database 450.

It will be appreciated that different types of zones can be created to exploit the syncing mechanism in order to implement some functionality required by one or more services in the client-server architecture 200. For example, zones can be created to store hand-outs, hand-ins, bookmarked contexts associated with third-party applications, roster information for a class, progress tracking information, etc. Furthermore, each of the zones described above can be scoped to a single user (i.e., as a personal zone) or multiple users. For example, a hand-out zone 465 is created to store data related to a hand-out (e.g., attachments, resources for hand-ins uploaded by students, etc.) and can be scoped to a group of students identified in the hand-out. A progress zone 465 is created to store progress information for a number of students. The progress zone 465 can be scoped to a class, or a particular hand-out published for a class. A roster zone 465 is created to store data related to class structure for an organization. The roster zone 465 can be scoped to the organization.

Figure 6A:
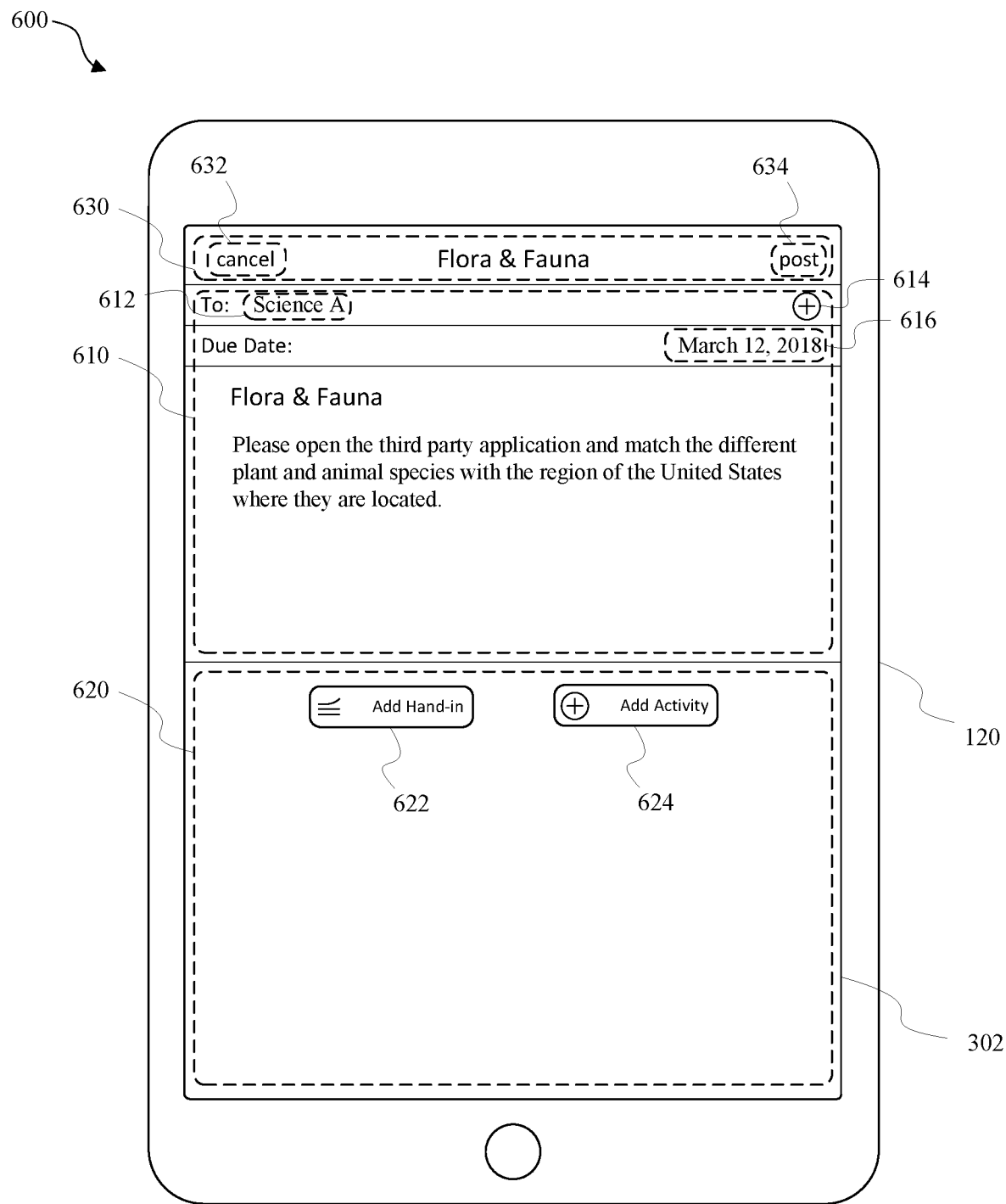
FIGS. 6A-6E illustrate a graphical user interface of the client application, in accordance with some embodiments.

FIGS. 6A-6E illustrate a GUI 600 of the client application 205, in accordance with some embodiments. The GUI 600 can be used to edit the information stored in a hand-out an instructor is preparing to assign to a class. The GUI 600 can be presented on a display 302 of the client device 120. As shown in FIG. 6A, the GUI 600 is displayed on a tablet computer such as client device 120-2. The GUI 600 can include a number of elements including graphics, text, icons, shapes, input fields, display regions, etc. In some embodiments, the GUI 600 is displayed in response to an instructor selecting the second icon 334 or the third icon 336 in the GUI 300.

The GUI 600 includes a first display region 610, a second display region 620, and a third display region 630. The first display region 610 is utilized to display information related to a hand-out created by an instructor for a particular class or group of students. The second display region 620 is utilized to display attachments to the hand-out. As shown in FIG. 6, the first display region 610 occupies a first portion of the pixels included in the display 302, and the second display region 620 occupies a second portion of the pixels included in the display 302. The third display region 630 occupies a third portion of the pixels included in the display 302. In some embodiments, the third display region 630 can be hidden, and the third display region 630 is displayed responsive to user input such as using a swipe touch gesture to cause the third display region 630 to appear proximate a top edge of the display 302.

As shown in FIG. 6A, the first display region 610 includes an interface to indicate a group of students that will be assigned the hand-out. The interface shows a label (e.g., "To:"), a user interface element 612, and a user interface element 614. An instructor can specify a group of students to be assigned the hand-out by either typing an identifier for the student(s) in the user interface element 612 or selecting the user interface element 614 and selecting the group of students from a list.

In some embodiments, selecting the user interface element 614 causes the client application 205 to request roster data for the classes associated with the instructor signed into the client application 205. The roster data includes identifiers for all students enrolled in any classes associated with the instructor. The client application 205 can request the list of identifiers from the school management service 240. Alternately, the client application 205 can retrieve the list of identifiers from a local memory 420 of the client device 120. For example, a roster service can periodically request the roster data from the school management service 240, which stores the roster data in a roster zone 465 of the remote database 460. The roster zone 465 can be scoped to a particular class and the instructor can be subscribed to the roster zones 465 for those classes associated with the instructor. Thus, through the syncing mechanism, the daemon 440 will download the roster data into the local database 450 of the client device 120, where it can be accessed by the client application 205.

The first display region 610 also includes an interface to indicate a due date for the students to complete the activities attached to the hand-out and submit any hand-ins assigned in the hand-out. The interface shows a label (e.g., "Due Date:") and a user interface element 616. The user interface element 616 can display a date (e.g., a time period) for completing the assignment. Selecting the user interface element 616 can cause a representation of a calendar to be displayed that let's an instructor select the date.

The first display region 610 also includes a number of text fields that can be edited by the instructor to change a title and a body of the hand-out. For example, as shown in FIG. 6A, the instructor has specified a title of "Flora & Fauna" for the hand-out and written a set of instructions provided to the student on how to complete the assignment.

The second display region 620 includes a pair of user interface elements referred to as a first icon 622 and a second icon 624. The first icon 622 can be selected by an instructor to add a placeholder for a hand-in to the hand-out. The second icon 624 can be selected by an instructor to add an activity to the hand-out. Any attachments to the hand-out can be listed below the first icon 622 and the second icon 624. As shown in FIG. 6A, there are no placeholders for hand-ins or activities currently attached to this hand-out.

Figure 6B:
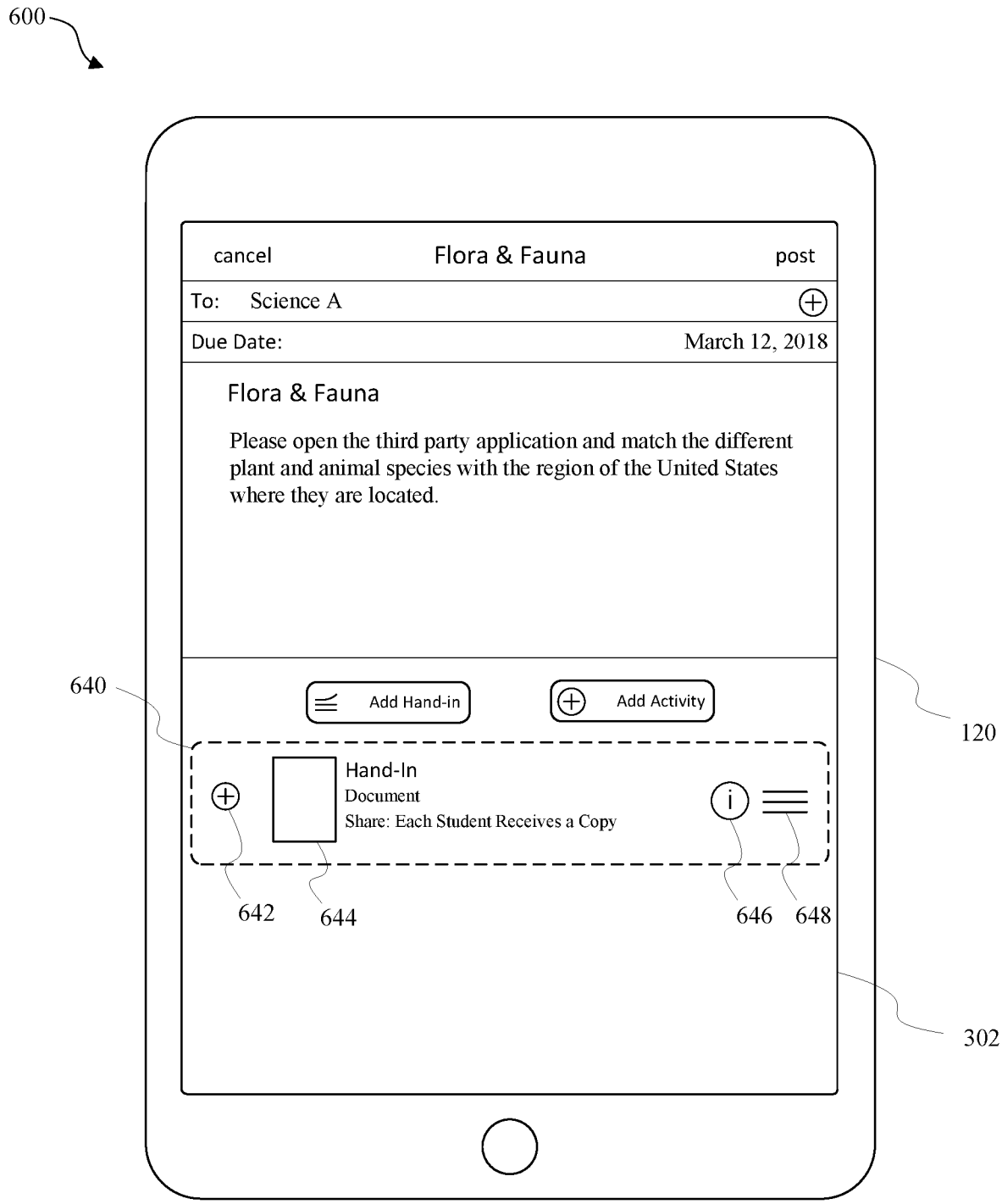

As shown in FIG. 6B, attaching a placeholder for a hand-in to the hand-out populates a box 640 of the second display region 620 with a number of user interface elements. For example, a first user interface element 642 enables the options for the hand-in to be edited, a second user interface element 644 displays information related to the hand-in, a third user interface element 646 enables a user to display more detailed information about the hand-in, and a fourth user interface element 648 enables a user to re-order the attachments to a hand-out or delete (e.g., un-attach) the placeholder for the hand-in from the hand-out. In some embodiments, the second user interface element 644 includes a thumbnail image of a representation of the resource for the hand-in and text located next to the thumbnail image that provides information related to the hand-in. For example, the text can indicate a title of the hand-in and a type of resource that will be generated for the hand-in. It will be appreciated that this information may be omitted or additional information may be included in lieu of the information described herein.

Returning to FIG. 6A, selecting the second icon 624 causes the client application 205 to display an interface that includes user interface elements that enable an instructor to attach an activity to the hand-out. The types of activities can include an activity completed with a third-party application, an activity performed by viewing or editing an attachment, an activity completed by viewing a network resource associated with a bookmark or link within a browser application, and an activity completed by viewing a multimedia file (e.g., image(s), video(s), etc.).

Figure 6C:
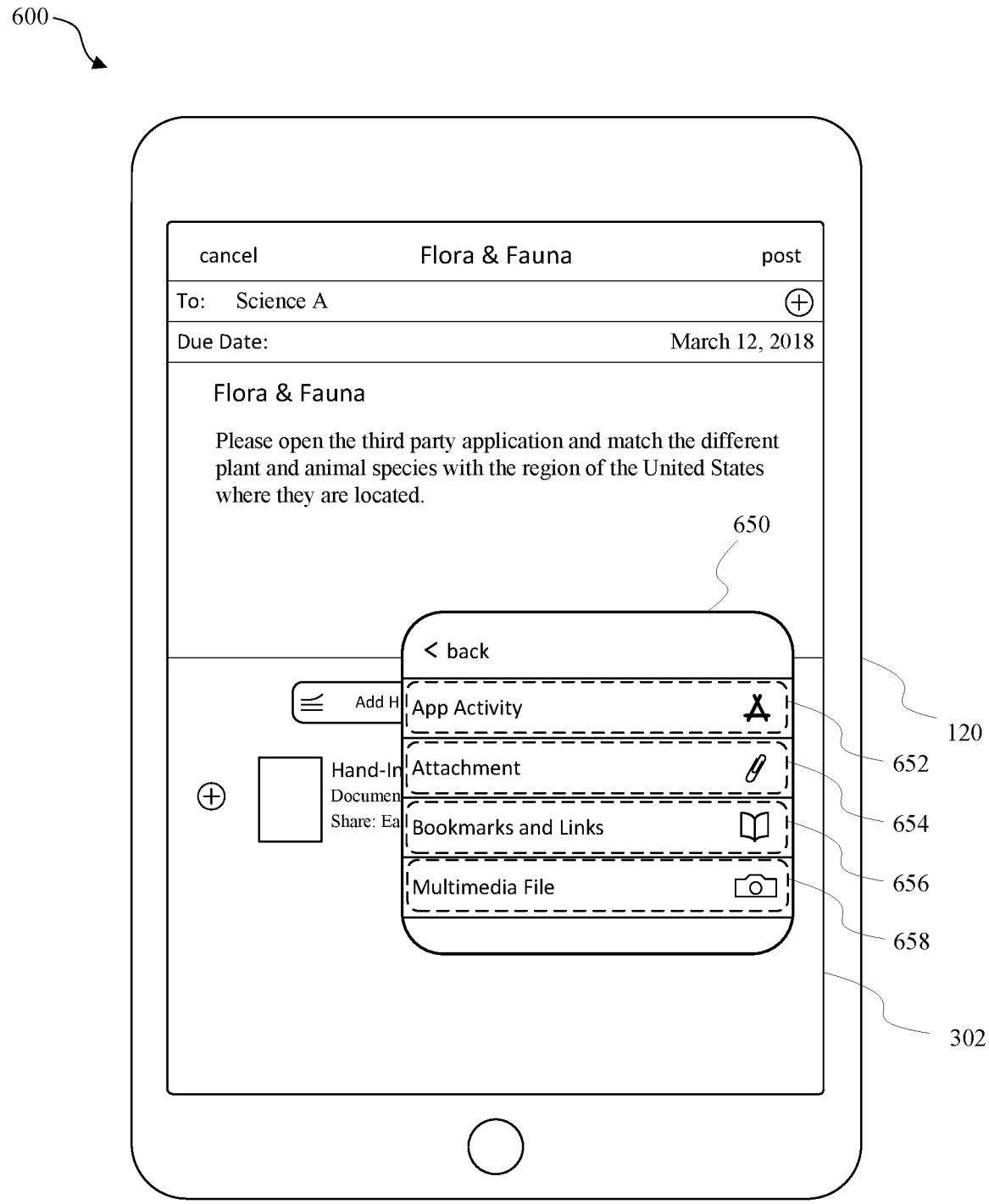

As shown in FIG. 6C, a box 650 can be displayed in response to a user selecting the second icon 624 in the GUI 600. The box 650 includes a first user interface element 652 that enables an instructor to associate an application activity with the hand-out. For example, a third-party application can be configured to present a quiz to a student and prompt the student to answer the questions included in the quiz. As another example, a third-party application could provide an interactive lesson for a student that includes the student following instructions to perform a task (e.g., writing source code for a program, playing a game, matching images with words in a foreign language, etc.). As yet another example, the third-party application could present text for a digital book or textbook to a student to read one or more sections of the book or textbook.

The box 650 includes a second user interface element 654 that enables an instructor to attach a file to the hand-out. The file can include a document, a spreadsheet, a presentation (e.g., a slide deck), source code, or any other type of file that can be viewed with an application on the client device 120.

The attached file enables the instructor to distribute materials that are typically read or viewed by a student. In some embodiments, the instructor can specify whether a single file is shared among all students in the class, referred to as a collaborative option, or whether clones of a file (e.g., copies) are shared with each student individually. The instructor can also specify permissions associated with the file, rendering the attached file read-only or allowing read-write access for a student to edit the file.

The box 660 includes a third user interface element 666 that enables an instructor to attach a bookmark or link to the hand-out. A bookmark or link refers to a hyperlink that specifies a uniform resource locator (URL) for a resource accessible over a network such as the Internet. The link can enable students to view web-sites that may be pertinent to the lesson.

The box 650 includes a fourth user interface element 658 that enables an instructor to attach a multimedia file to the hand-out. A multimedia file can include a picture, a slide show, a video, or other types of multimedia such as virtual reality data or a three-dimensional model. The multimedia files can then be viewed by a student using an application installed on the client device 120, such as an image viewer application.

Figure 6D:
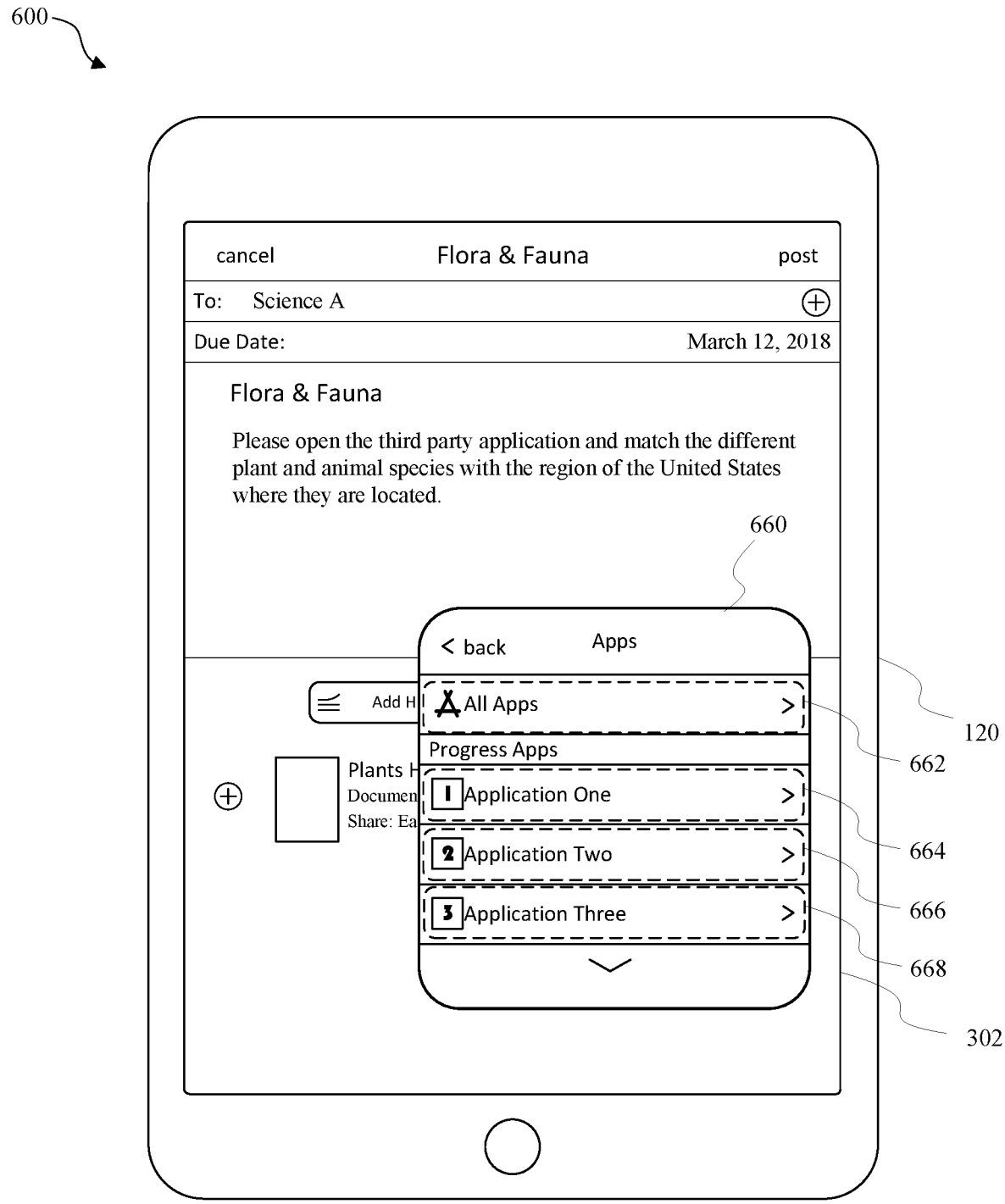

When a user selects the first user interface element 652 to attach an activity associated with a third-party application to the hand-out, the box 650 can be replaced with the box 660, as shown in FIG. 6D. The box 660 provides an instructor with the ability to select the third-party application for the activity from a list of applications.

In some embodiments, the box 660 includes a first user interface element 662 to select any application from a list of available applications. However, in some cases, some third-party applications can implement at least a portion of a class kit software framework that enables the third-party application to provide progress data to one or more services for tracking progress of students that complete activities within the third-party application. These third-party applications that implement at least a portion of the class kit software framework can be referred to herein as progress applications. The progress applications that implement at least a portion of the software framework can be listed separately in individual user interface elements below the first user interface element 662. For example, a second user interface element 664 enables an instructor to attach an activity for a first progress application, a third user interface element 666 enables an instructor to attach an activity for a second progress application, and a fourth user interface element 668 enables an instructor to attach an activity for a third progress application.

In some embodiments, a third-party application implements at least a portion of the class kit software framework, which provides a means for building interactive features into the third-party application. For example, the class kit software framework enables a software developer to define a context associated with the application. As used herein, a context refers to metadata that describes the structure of the application. For example, a digital textbook can be described using a context that defines the chapters, sections, pages, problem sets, and similar structure within the digital textbook. In general, a context defines metadata that enables an activity to be defined for the third-party application.

The context also enables progress of the activity within the application to be tracked. For example, referring back to the digital textbook example, an instructor can define an activity related to reading a chapter of the textbook. The context enables the instructor to specify the particular chapter or section in the digital textbook the instructor wants to assign when defining the activity. Therefore, when specifying an activity using the GUI 600, the client application 205 can consult the context to determine what activities can be completed within the third-party application.

In some embodiments, an instructor can manually search for a list of available contexts associated with one or more third-party applications and select a set of contexts that the instructor would like to assign to various hand-outs. The set of contexts can be saved in the memory 420 and associated with the client application 205 in order for the instructor to be able to attach activities associated with those contexts to a hand-out.

In other embodiments, each progress application installed on the client device 120 can notify the daemon 440 of available contexts provided by the progress application. The instructor can utilize the client application 205 to browse through a list of available contexts published by the one or more progress applications and select a number of contexts as favorite contexts. For example, by selecting the first user interface element 662 in the box 660, the instructor is able to browse all available contexts provided by the progress applications installed on the client device 120. The instructor can then select particular contexts as favorite contexts of the instructor. The subset of available contexts selected as favorites by the instructor can be stored in the local database 450 of the client device 120. The favorite contexts selected by the instructor can also be synced to a personal zone 465 in the remote database 460 scoped to the instructor. The additional user interface elements in the box 660 can then be displayed with each user interface element corresponding to a particular favorite context. The instructor can then select a particular favorite context to attach to the hand-out.

Figure 6E:
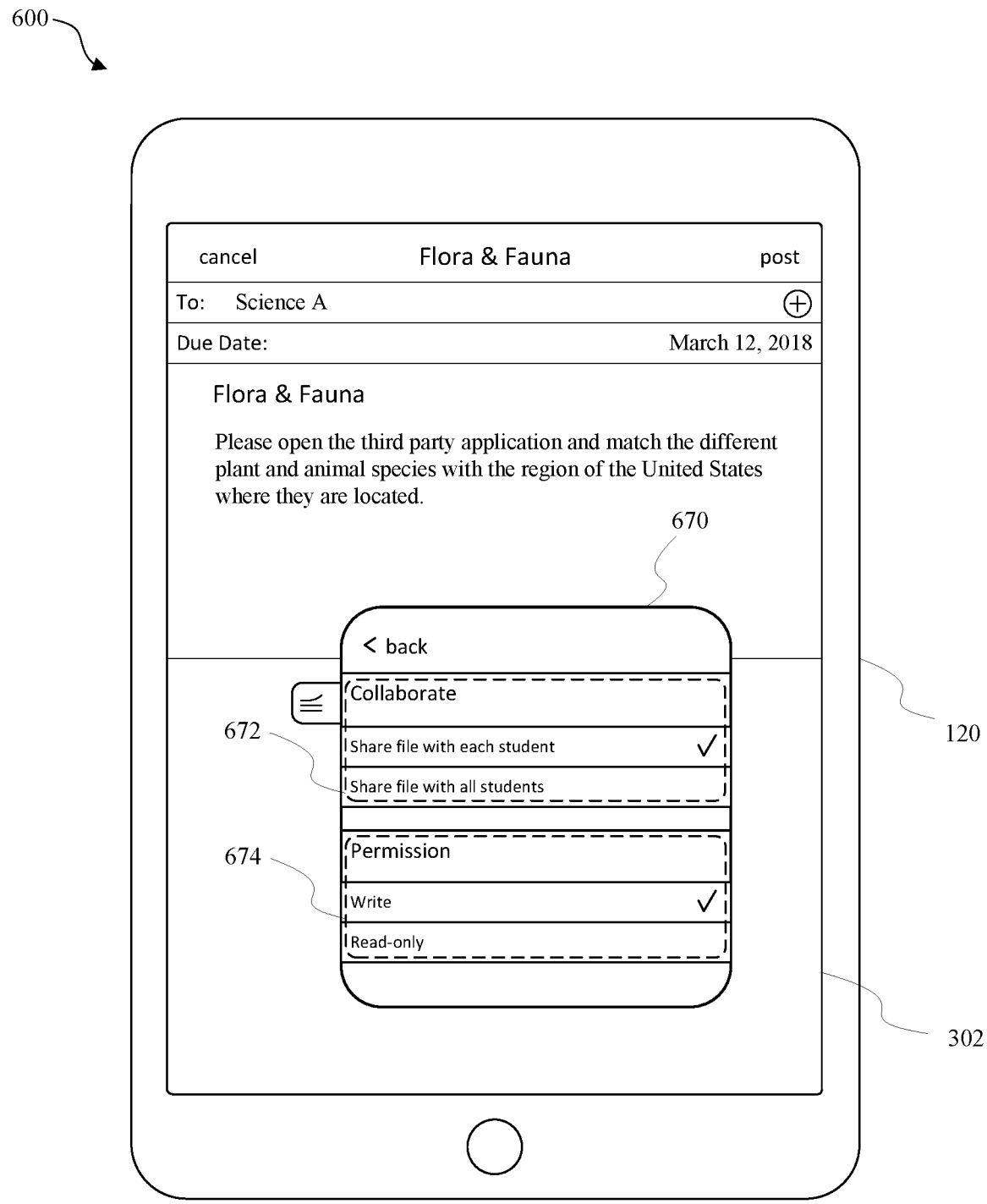

As shown in FIG. 6E, selecting the second user interface element 654 causes the client application 205 to display a box 670 that includes two user interface elements that enable an instructor to specify options associated with an attached file. In some embodiments, the options include permissions for the shared file as well as whether the file is collaborative. For example, as shown in FIG. 6E, a user interface element 672 enables an instructor to indicate whether the file is collaborative. This option determines whether the file is shared as a single resource among a plurality of users or whether a copy of the file is shared with each user individually. A user interface element 674 enables an instructor to change permissions for the resource for the file. If the resource is read-only, then the student will not be able to edit the resource; however, if the resource is read-write, then the student can edit the file.

It will be appreciated that additional user interface elements, not explicitly shown in FIG. 6E can be included in the box 670. For example, other user interface elements could enable an instructor to specify a file stored in the local memory 420 to attach to the hand-out.

Figure 7:
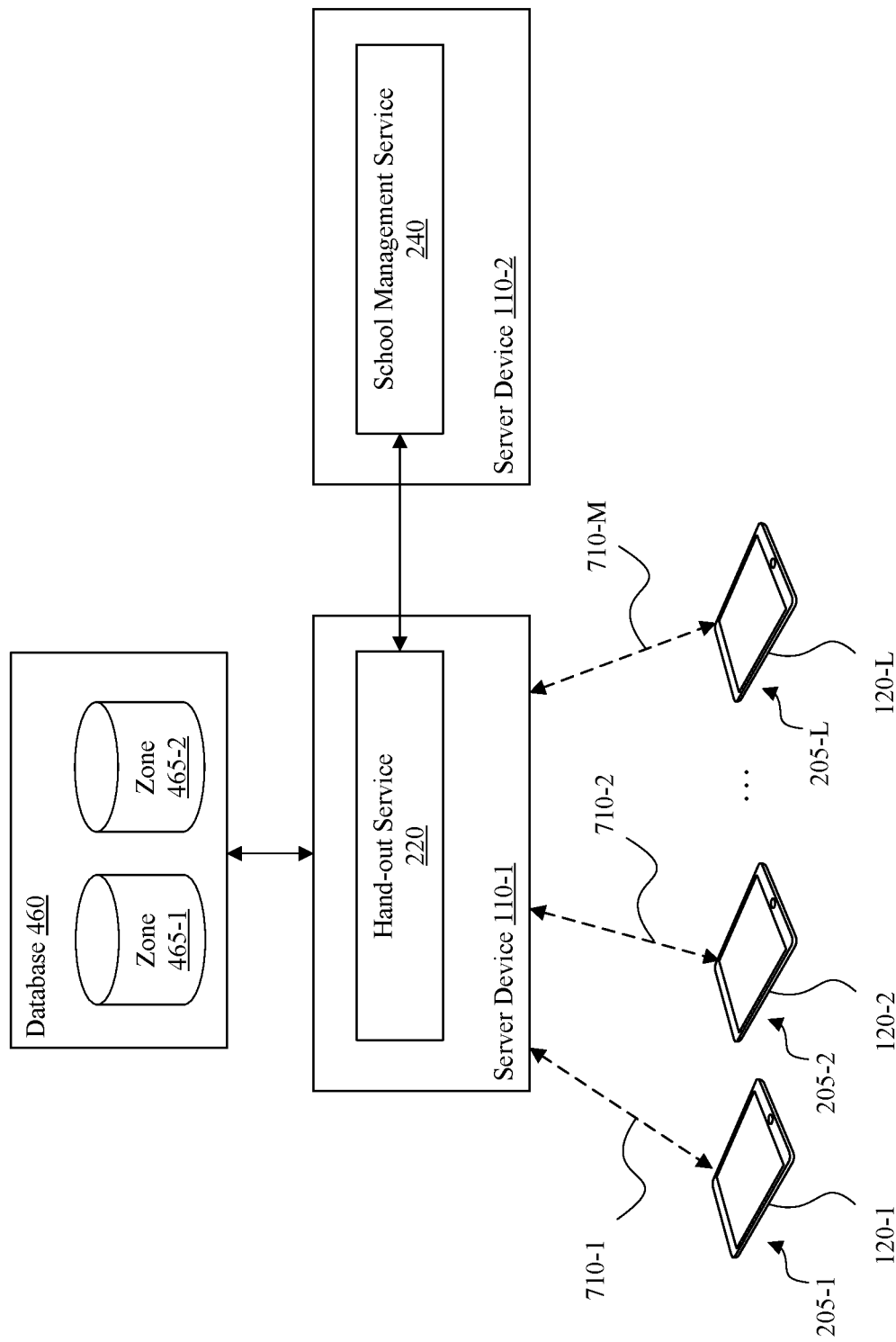
FIG. 7 illustrates a client-server relationship between the hand-out service and a number of client application(s) and/or daemon(s) associated with a plurality of students in a class, in accordance with some embodiments.

FIG. 7 illustrates a client-server relationship between the hand-out service 220 and a number of client application(s) 205 and/or daemon(s) 440 associated with a plurality of students in a class, in accordance with some embodiments. As shown in FIG. 7, a class can include L students enrolled in the class, each student having access to one or more client devices 120. As described above, the hand-out service 220 is configured to enable an instructor to create and manage hand-outs using a plurality of different client devices 120 controlled by the instructor. In addition, the hand-out service 220 is also configured to assist in distributing hand-outs to a client application 205 included in a plurality of additional client devices 120 associated with a group of students.

In some embodiments, an instructor can finish preparing the hand-out and then publish the hand-out to assign the hand-out to the group of students to view and complete. The hand-out service 220 copies the hand-out into a hand-out zone 465, scoped to a group of students specified in the hand-out, in the remote database 460. In response to the instructor publishing the hand-out, the hand-out service 220 notifies each of the client devices 120 associated with the students, over a variety of paths 710, that the hand-out zone 465 in the remote database 460 has been updated. A path 710 can refer to a network path associated with a destination address for a network interface of a particular client device 120.

The notification can be received by the daemon 440 included in each of the client devices 120. The daemon 440 then downloads the data from the hand-out zone 465 to the local database 450 in the client device 120. In some embodiments, the hand-out service 220 utilizes the school management service 240 in order to retrieve user identifiers for the students in the class. The user identifiers can be utilized to transmit the notifications, using a separate notification service, to each of the client devices 120 associated with a student in the given class.

In some embodiments, the group of students can be identified by the school management service 240, which, in response to receiving a request from the hand-out service 220, is configured to return a list of identifiers for the students enrolled in a particular class. In other embodiments, a roster service can interface with the school management service 240 to create roster data in a roster zone 465 of the remote database 460 scoped to the organization. The hand-out service 220 can then access the roster data from the remote database 460 instead of getting the roster data from the school management service 240 directly.

In response to the request to publish a hand-out, the hand-out service 220 can copy the hand-out from a personal zone 465 scoped to the instructor to a hand-out zone 465 scoped to the group of students in the class. Once the copy of the hand-out is stored in the hand-out zone 465, the hand-out service 220 transmits a notification of the change to any client devices associated with students that are subscribed to the hand-out zone 465. The daemon 440 included in a client device 120 of a student that is associated with the hand-out zone 465 will automatically download the copy of the hand-out stored in the hand-out zone 465 to a local memory of the client device 120 in response to receiving the notification from the hand-out service 220. The hand-out can then be viewed by the client application 205 of the client device 120 for the student such that the student can complete the activities and/or view the materials attached to the hand-out.

Figure 8A:
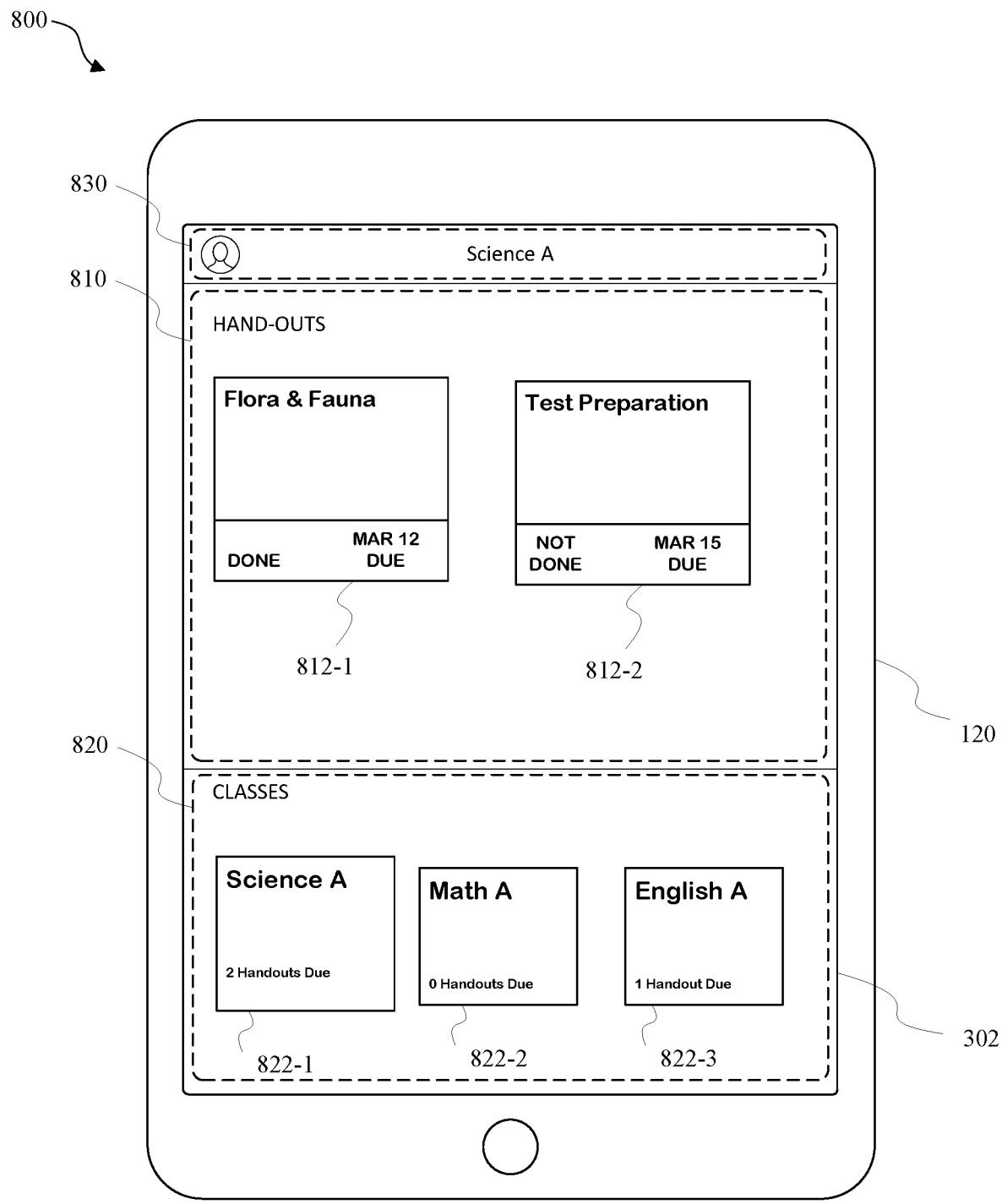
FIGS. 8A-8C illustrate a graphical user interface implemented by a client application on a client device associated with a student, in accordance with some embodiments.
Figure 8B:
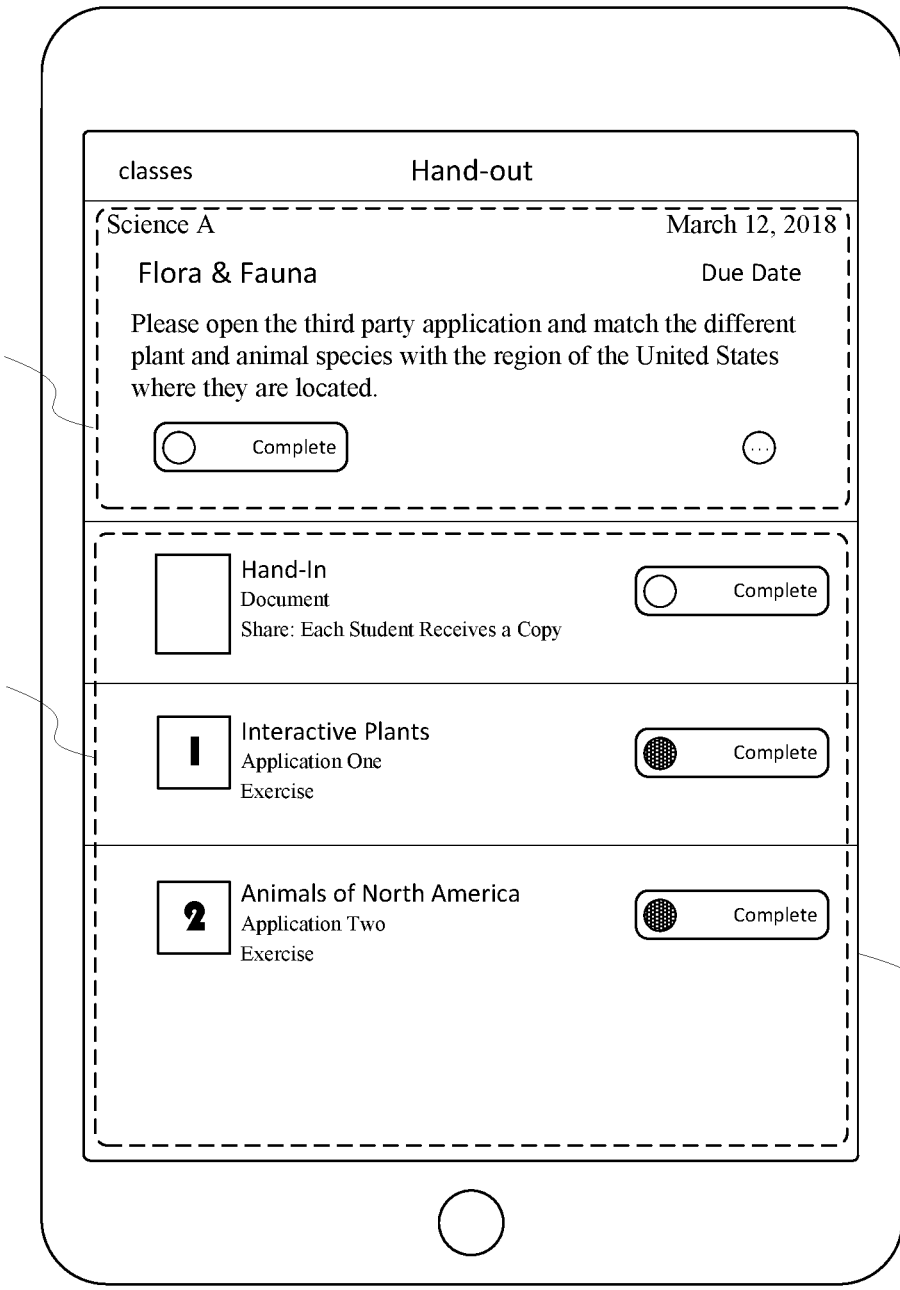
Figure 8C:
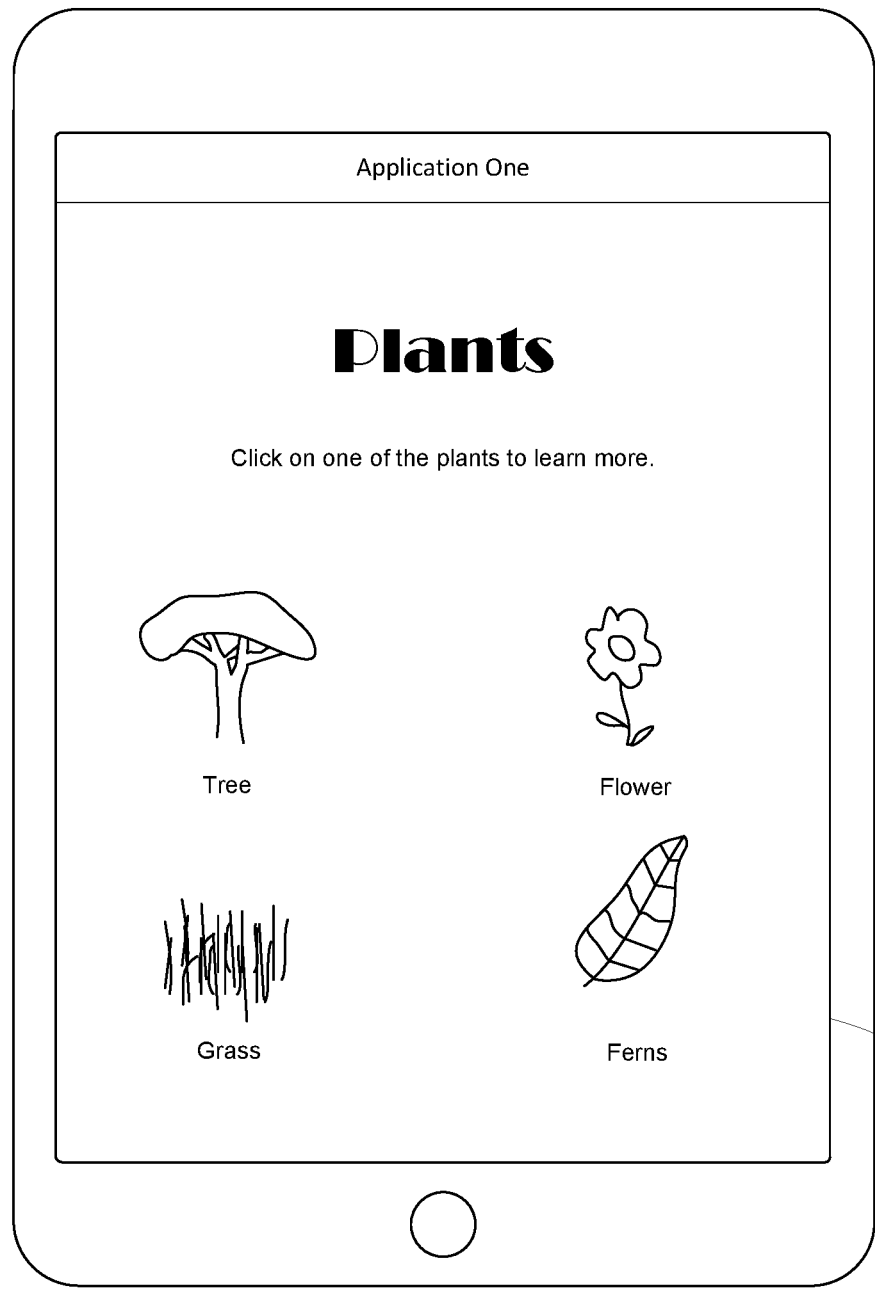

FIGS. 8A-8C illustrate a GUI 800 implemented by a client application 210 on a client device 120 associated with a student, in accordance with some embodiments. The GUI 800 is different than the GUI 600. The client application 210 can be configured to display GUI 800 in response to a user signing into a user account associated with a student instead of an instructor. The GUI 800 enables a student to view a hand-out for a class assigned to a group of students by an instructor for the class.

In some embodiments, the GUI 800 includes a first display region 810, a second display region 820, and a third display region 830. The first display region 810 is utilized to display representations of a hand-out assigned to the student for a particular class. The second display region 820 is utilized to display representations of classes in which the student is enrolled. As shown in FIG. 8A, the first display region 810 occupies a first portion of the pixels included in the display 302, and the second display region 820 occupies a second portion of the pixels included in the display 302.

The first display region 810 includes a header that indicates elements 812 represent separate and distinct hand-outs assigned to the student in the selected class. In some embodiments, each element 812 is defined by a box that includes a title of the hand-out, a descriptor for a due date associated with the hand-out, and an indication of whether the student has completed the hand-out. For example, a first element 812-1 is associated with a first hand-out for a "Flora & Fauna" assignment, which has a due date of March 12 and has been completed by the student; and a second element 812-2 is associated with a second hand-out for a "Test Preparation" assignment, which has a due date of March 15 and has not been completed by the student. It will be appreciated that, in other embodiments, the elements 812 can take different forms. For example, the elements 812 can omit the due date and/or completion indicator. Alternately, the elements 812 can include information in addition to or in lieu of the due date and/or the completion indicator. Additionally, the elements 812 can include graphics such as an image or icons representing different activities assigned in the hand-out. In some cases, the graphics can be animated, such as, by playing a video or showing a slide show of images attached to the hand-out as a background of the element 812.

The second display region 820 includes a header that indicates elements 822 represent separate and distinct classes in which the student is enrolled. The student can select a particular element 822 in order to see what hand-outs have been assigned to the student by an instructor for a class in the first display region 810. In some embodiments, each element 822 is defined by a box that includes a title of the class and a descriptor for a number of hand-outs assigned to the student in the class. For example, a first element 822-1 is associated with a "Science A" class, which has two hand-outs due; a second element 822-2 is associated with a "Math A" class, which has zero hand-outs due; and a third element 822-3 is associated with an "English A" class, which has one hand-out due. It will be appreciated that, in other embodiments, the elements 822 can take different forms. For example, the elements 822 can omit the indicator for the number of hand-outs assigned to the student in the class.

In some embodiments, a student can select a particular class using an input interface of the client device 120. For example, the student can use a touch interface to select an element 822 associated with one of the available classes in which the student is enrolled. Upon selection of an element 822, the element 822 is activated and the elements 812 in the first display region 810 may be updated to reflect the hand-outs associated with the class represented by the selected element 822 in the second display region 820. A selected element 822 (e.g., the currently activated element) can be highlighted to indicate the element 822 is active. Highlighting can be implemented by increasing the size of the element, changing a color associated with the element 822 or a border of the element 822, displaying a box around the selected element 822, and so forth. As shown in FIG. 8A, the first element 822-1 is activated and shown as larger than the second element 822-2 and the third element 822-3.

A third display region 830 is located proximate a top edge of the display 302. The third display region 830 includes elements that enable a user of the client application 210 to sign-in to a user account for the student. In some embodiments, the third display region 830 is hidden and can be displayed responsive to a user input, such as by using a vertical swipe touch gesture to cause the third display region 830 to be unhidden.

A first icon 832 is displayed proximate a left side of the third display region 830. The first icon 832, when selected by a user, can cause the client application 210 to prompt a user to enter credentials to sign-in to a user account for the student. In some embodiments, the first display region 810 and the second display region 820 are hidden until a user signs into a particular user account using the first icon 832. In some embodiments, upon launch of the client application 210, a separate interface is displayed to the user that prompts the user to enter credentials to sign-in to a user account. The GUI 800 is only displayed on the display 302 once the user has successfully signed into a particular user account. The first icon 832 can then be used to sign-out of the user account and/or to sign-in to a different user account.

Selecting a particular element 812 that represents a hand-out in a particular class causes the GUI 800 to be updated with data representing the hand-out, as shown in FIG. 8B. A first display region 840 presents information included in the hand-out such as a title of the hand-out, a due date for the hand-out, an indication of the class in which the hand-out is assigned, and instructions included in the hand-out by the instructor. A second display region 850 presents information related to any hand-ins and/or activities that were attached to the hand-out by the instructor.

Selecting an activity within the second display region 850 will open the activity in a different application. If the activity is an attachment of a particular file type, then an application corresponding to that file type will be opened to view the attachment. If the activity is a bookmark or link, then a web browser application will be opened and the resource specified by the URL in the bookmark or link will be retrieved. If the activity is a multimedia file, then a multimedia application will be opened to view the multimedia file. However, if the activity is associated with a progress application (e.g., if the activity is associated with a context provided by a progress application and selected by an instructor as a favorite context), then the progress application will be opened to complete the activity. In some embodiments, the progress application implements at least a portion of a class kit software framework to track the progress of a student when completing the activity.

As shown in FIG. 8C, a GUI 860 for a first progress application is presented to the student on the display 302. The GUI 860 can provide output in the form of information presented as pixel data. As shown in FIG. 8C, the GUI 860 for the first progress application can provide text and graphics that help a student learn a particular subject. The GUI 860 can include elements, some of which may be interactive. For example, the student could select an image of a tree to display more detailed information about tress. It will be appreciated that the third-party software shown in FIG. 8C is only shown for illustrative purposes and that the design of the software is not limited to any specific type of learning software. In fact, the varieties of software that can implement the class kit software framework are expansive.

Figure 9:
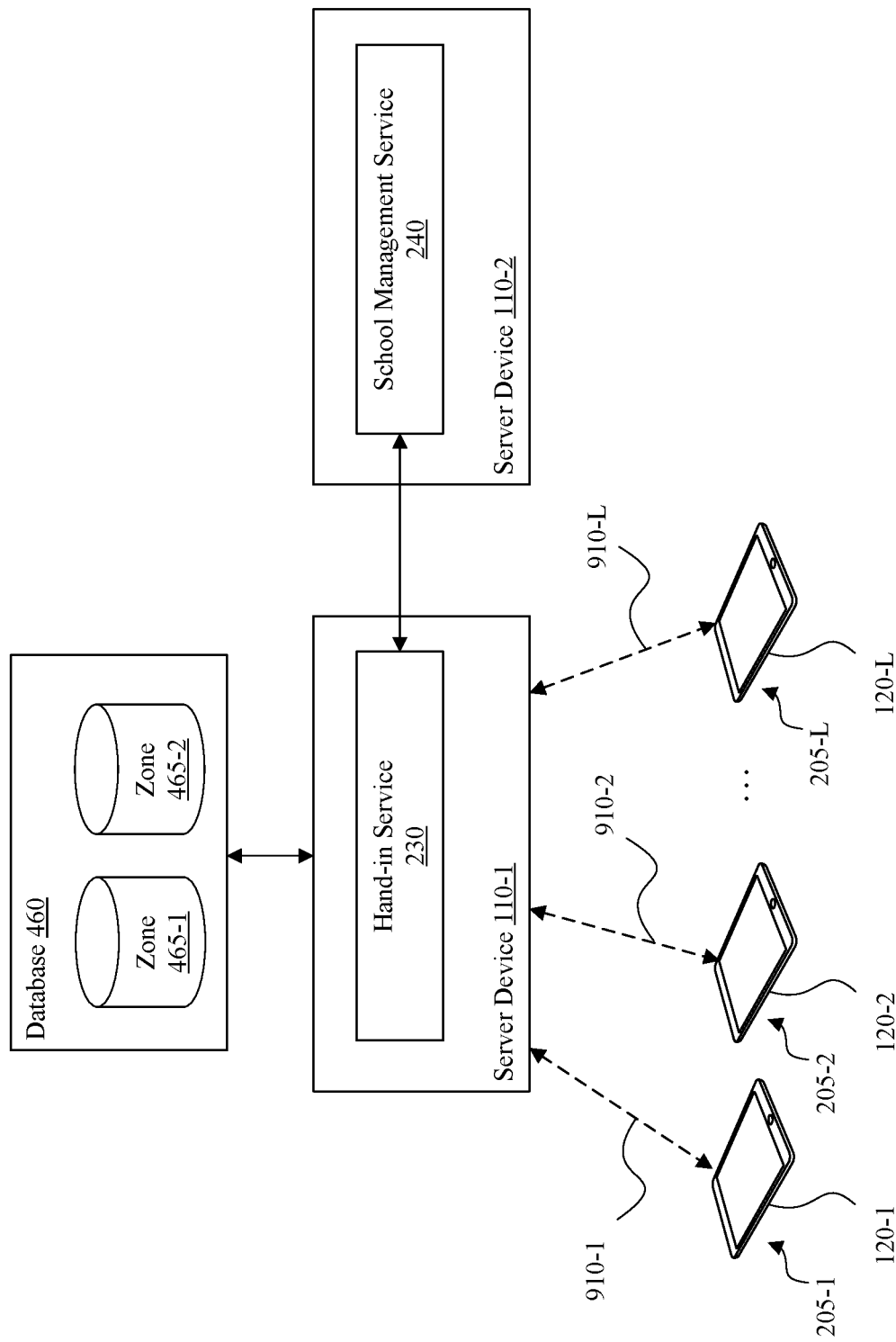
FIG. 9 illustrates a client-server relationship between the hand-in service and a number of client application(s) and/or daemon(s) for a plurality of students in a class, in accordance with some embodiments.

FIG. 9 illustrates a client-server relationship between the hand-in service 230 and a number of client application(s) 210 and/or daemon(s) 440 for a plurality of students in a class, in accordance with some embodiments. As shown in FIG. 9, a class can include L students enrolled in the class, each student having access to one or more client device 120. The hand-in service 230 is configured to assist in managing hand-ins included in one or more hand-outs assigned to corresponding groups of students.

In some embodiments, when a hand-out is published that includes a placeholder for a hand-in, the placeholder in the hand-out indicates that a student is required to turn in a file corresponding to the hand-in. Again, the student generates a file for the hand-in using one or more applications on the client device 120. The student can then submit the hand-in using the client application 205. Alternatively, the client application 205 can create a GUI element added to a third-party application (e.g., an application extension) that enables the student to submit the hand-in from the third-party application.

In some embodiments, a document created by the student can be synced to a personal zone 465-1 of the remote database 460 such that the student can access the document from different client devices 120. When the student chooses to turn-in the document as a hand-in, the hand-in service can copy the document from the personal zone 465-1 scoped to the student to a hand-in zone 465-2 scoped to the class and, optionally, a particular hand-out corresponding to the hand-in. By moving the document from the personal zone 465-1 for the student into the hand-in zone 465-2, the instructor can view the document. In some embodiments, the document is also deleted from the personal zone 465-1 scoped to the student, and the student is granted read-only access to the copy of the document stored in the hand-in zone 465-2. Consequently, when the document is submitted as the hand-in, the student can no longer edit the document.

In some embodiments, the group of students associated with a particular hand-out can be identified by the school management service 240, which, in response to receiving a request from the hand-in service 230, is configured to return a list of identifiers for the students enrolled in a particular class. In other embodiments, a roster service can interface with the school management service 240 to create roster data in a zone 465 of the remote database 460 scoped to the organization. The hand-in service 230 can then access the roster data from the remote database 460 instead of getting the roster data from the school management service 240 directly.

Figure 10:
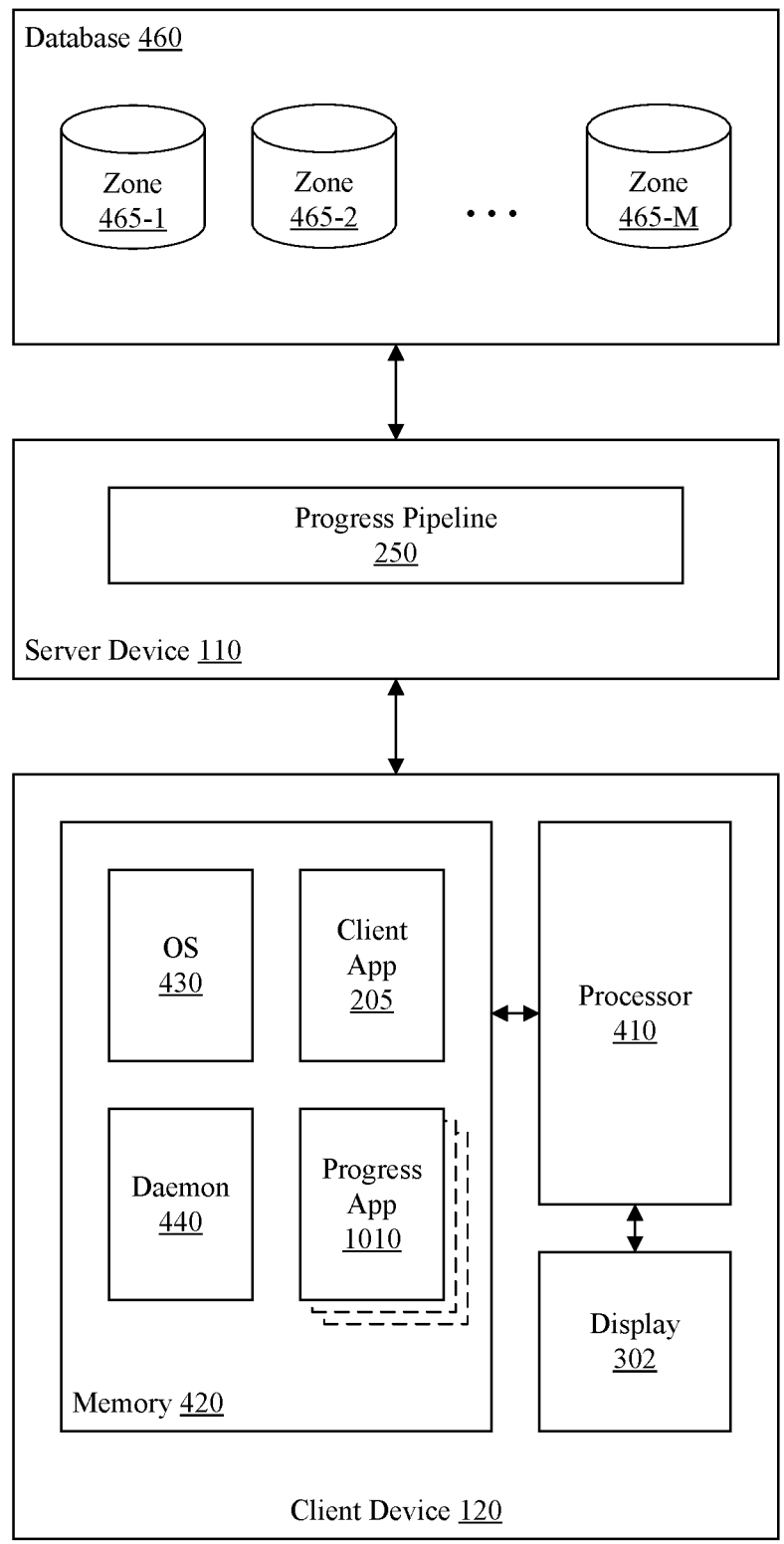
FIG. 10 illustrates a client-server relationship between the progress pipeline and a client application and/or daemon, in accordance with some embodiments.

FIG. 10 illustrates a client-server relationship between the progress pipeline 250 and a client application 210 and/or daemon 440, in accordance with some embodiments. In order to fully realize the benefits of the class kit software framework within the classroom setting, a means for tracking the activity of each student using associated client devices 120 is required. The daemon 440 and the progress pipeline 250 provide such functionality for any third-party applications that implement at least part of a class kit software framework.

As shown in FIG. 10, a client device 120 includes a processor 410 and a memory 420 including software and data. The memory 420 of the client device 120 includes an operating system 430, a client application 210, a daemon 440, and one or more progress applications 1010. The daemon 440 implements an API to communicate with the progress applications 1010 via the class kit software framework.

In some embodiments, each of the one or more progress applications 1010 implements at least a portion of the class kit software framework for tracking a progress associated with one or more contexts provided by the progress application 1010. The class kit software framework includes at least one of source code added to the source code for the progress application 1010, source code for a library of functions utilized by the progress application 1010, and a library of compiled functions that can be linked to the source code for the progress application 1010. The software framework provides functions included in the source code of the progress application 1010 that generate API calls to the daemon 440 executing in the background of the client device 120. The API calls include progress tracking information related to operations performed by a user in the progress application 1010.

A software developer can implement API calls within the source code for the progress application 1010 in order to implement a progress tracking functionality within the progress application 1010. For example, in a document viewing application, the source code can be configured to generate an API call indicating a user has read a particular page of a document each time the user navigates to a new page. The software developer can also define one or more contexts for the progress application 1010 that specify a structure of the progress application 1010 in order to allow an instructor to create activities attached to hand-outs within the client application 210 that utilize the progress application 1010. Each context is a data structure that defines the structure of the progress application 1010 using a standard language (e.g., pre-defined keywords) and/or format.

It will be appreciated that a single progress application 1010 can be associated with more than one context. For example, a textbook application could be implemented to view multiple textbooks stored in different files or data structures. A different context could be defined for each of the different textbooks. Each context can define a specific layout of the corresponding textbook, such as defining the title of the textbook, an author of the textbook, an edition of the textbook, a number of chapters in the textbook, a table of contents for the textbook including a description of each chapter of the textbook, a description of the sections included in each chapter, a description of each page included in each section, a description of problem sets within each chapter or section, and so forth. An instructor can then use these contexts to select specific activities associated with a particular context and attach these selected activities to a hand-out assigned to the students in a class.

The daemon 440 is configured to receive the API calls from the progress application 1010. The API calls can include progress tracking information generated within the progress application 1010. In some embodiments, progress tracking can be enabled or disabled. The daemon 440 is configured to ignore progress tracking information received from the progress applications 1010 when progress tracking is disabled. However, if progress tracking is enabled, then the daemon 440 is configured to process the progress tracking information. In some embodiments, the daemon 440 aggregates progress tracking information received from two or more API calls before processing the aggregate progress tracking information received from one or more progress applications 1010.

In some embodiments, the progress tracking can be enabled or disabled for individual progress applications 1010. Thus, progress tracking for a first application can be enabled while progress tracking for a second application can be disabled. Thus, the daemon 440 is configured to filter out any progress tracking information from any applications where progress tracking is disabled and only process progress tracking information for applications where progress tracking is enabled.

In some embodiments, progress tracking for all progress applications 1010 installed on a client device 120 is enabled automatically upon installation of the client application 210. A user of the client device 120 is therefore required to disable progress tracking for the client device 120 or individual third-party applications installed on the client device 120 in order to prevent progress tracking information from being collected, which may be referred to as an opt-out policy. In other embodiments, progress tracking for all third-party applications 1010 installed on a client device 120 is disabled automatically upon installation of the client application 210. A user of the client device 120 is therefore required to enable progress tracking for the client device 120 or individual third-party applications installed on the client device 120 in order to allow progress tracking information to be collected, which may be referred to as an opt-in policy.

The progress tracking information can include, but is not limited to, information that identifies operations completed by a user of the client device 120 using the progress application 1010. For example, the progress tracking information can include information that indicates a user has viewed or read a particular chapter of a digital textbook, completed a number of problems presented to the user through a GUI of the progress application 1010, completed an operation such as clicking on a link or interacting with an interactive element of the progress application 1010, and so forth.

The progress tracking information can include personally identifying information (PII). This PII may be considered sensitive and, therefore, care is taken by the daemon 440 to secure this information when transmitted to a server device 110 from the client device 120. In some embodiments, a progress zone 465, scoped to a particular student, is utilized to store progress tracking information for each student associated with a user account. The progress tracking information is stored and encrypted locally in the memory 420 of the client device 120. The progress tracking information can also be encrypted remotely in the progress zone 465 of the remote database 460. The progress tracking information can be encrypted with different encryption keys locally or remotely. In addition, the daemon 440 can be configured to encrypt the progress tracking information in transit to the remote database 460. The encryption key used for in-transit encryption can be different from the encryption keys utilized locally or remotely. Consequently, the progress tracking information can be secured locally using various forms of authentication (e.g., biometric authentication, requiring a user to enter a passcode, etc.) and the progress tracking information can be secured remotely (i.e., on the server-side) using additional forms of authentication, such as mutual TLS as a secure transport mechanism.

Figure 11:
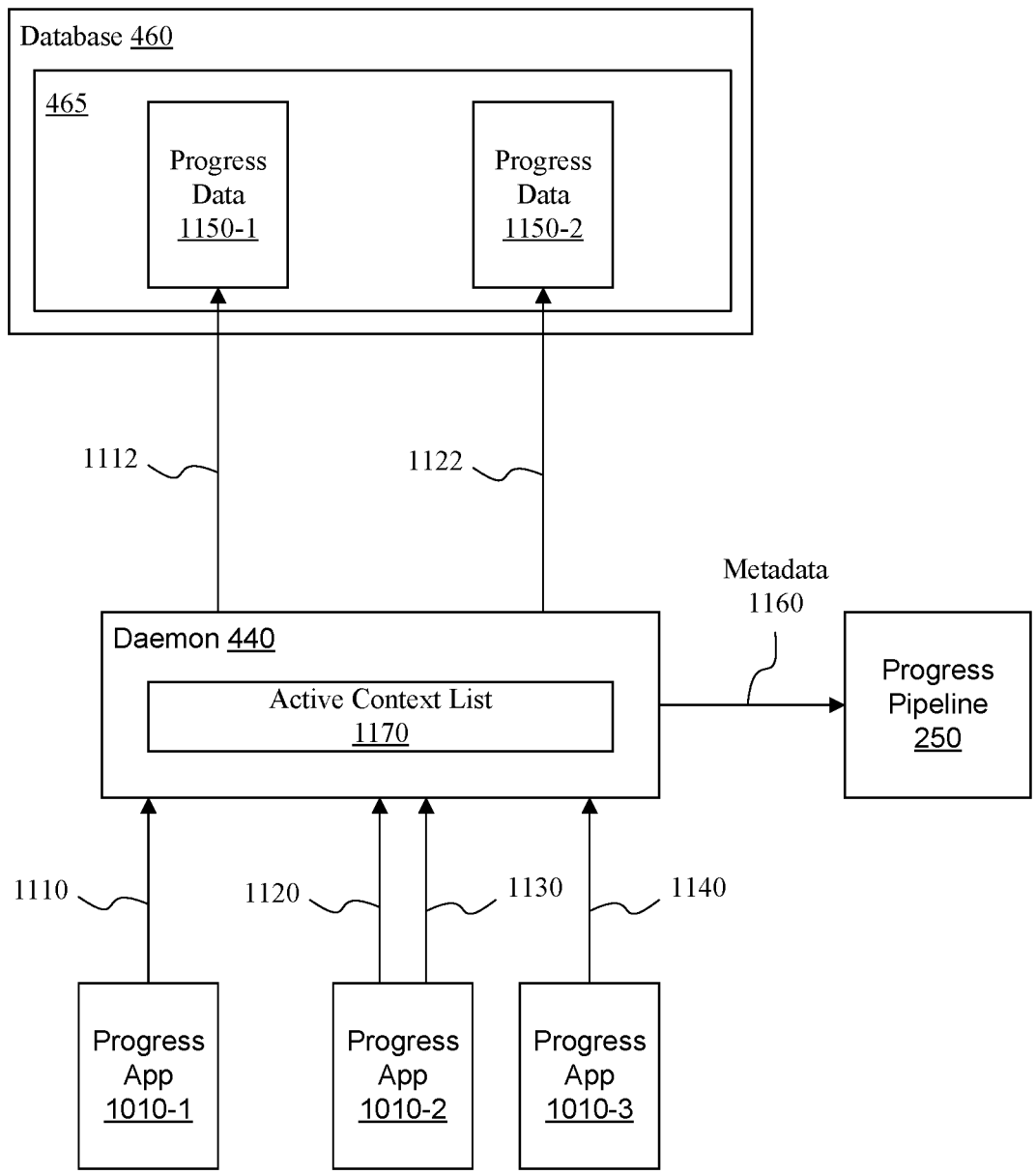
FIG. 11 illustrates the filtering of progress tracking information by the daemon, in accordance with some embodiments.

FIG. 11 illustrates the filtering of progress tracking information by the daemon 440, in accordance with some embodiments. In some embodiments, the daemon 440 is configured to filter progress tracking information received from the progress applications 1010 based on a set of active contexts associated with one or more hand-outs assigned to a student by one or more instructors. The daemon 440 can track a list of active contexts 1170 based on the attachments in one or more hand-outs that are currently assigned to the student (or class). In some embodiments, attachments in hand-outs that have a due date that is already passed can be closed by the instructor (e.g., de-activated) and removed from the active context list 1170. The daemon 440 is configured to filter the progress tracking information received from progress applications 1010 based on the list of active contexts 1170.

For example, a first instructor can assign a first hand-out to a particular student that includes an activity associated with a first context for a first progress application 1010-1; and a second instructor can assign a second hand-out to the particular student that includes an activity associated with a second context for a second progress application 1010-2.

The first context for the first progress application 1010-1 and the second context for the second progress application 1010-2 are considered active contexts. However, the student may use a third progress application 1010-3 that is not associated with any active contexts, and the daemon 440 can be configured to filter out (e.g., ignore) any progress tracking information 1140 received from the third progress application 1010-3 to avoid collecting any unnecessary progress tracking data. Likewise, the daemon 440 can also filter out any progress tracking information received from the first progress application 1010-1 and/or the second progress application 1010-2 that is associated with a different, inactive context. For example, an active context may define a structure for an e-book for Macbeth while an inactive context may define a structure for an e-book for Romeo and Juliet. Any progress tracking information received while the e-book for Macbeth is open in the progress application 1010 will be processed by the daemon 440 while progress tracking information received while the e-book for Romeo and Juliet is open in the progress application 1010 will be filtered out and ignored.

As shown in FIG. 11, first progress tracking information 1110 received from a first progress application 1010-1 and associated with a first context is processed by the daemon 440, where the first context is included in the list of active contexts 1170. In some embodiments, the daemon 440 stores the first progress tracking information 1110 as progress tracking information 1150-1 in a local database 450, The progress tracking information 1150-1, via the syncing mechanism, is uploaded to a progress zone 465 in the remote database 460 scoped to the student. Similarly, second progress tracking information 1120 received from a second progress application 1010-2 and associated with a second context is processed by the daemon 440, where the second context is included in the list of active contexts 1170. The second progress tracking information 1120 is stored as progress tracking information 1150-2 in the local database 450. Again, the progress tracking information 1150-2, via the syncing mechanism, is uploaded to the progress zone 465 in the remote database 460 scoped to the student.

However, third progress tracking information 1130 received from the second progress application 1010-2 and associated with a third context is ignored by the daemon 440, where the third context is not included in the list of active contexts 1170. Similarly, fourth progress tracking information 1140 received from the third progress application 1010-3 and associated with a fourth context is also ignored by the daemon 440, where the fourth context is not included in the list of active contexts 1170.

The daemon 440 also creates metadata 1160 associated with the encrypted progress tracking information 1150. The metadata 1160 can include a reference to the encrypted progress tracking information 1150 in the remote database 460 as well as a context identifier for the context associated with the progress tracking information. In some embodiments, the metadata 1160 includes additional information that could be utilized by the progress pipeline 250, such as a class identifier, a hand-out identifier corresponding to the context, an application identifier corresponding to the progress application 1010 that generated the progress tracking information 1150, or a user identifier associated with the user signed-in to a user account on the client device 120. Consequently, the progress pipeline 250 does not process the actual progress tracking information that could contain PII. Instead, the progress pipeline 250 merely processes the metadata 1160 associated with the progress tracking information, and the actual progress tracking information remains encrypted and stored in the personal progress zone 465 of the remote database 460.

It will be appreciated that, in other embodiments, the actual progress tracking information can be provided, either encrypted or unencrypted, to the progress pipeline 250 rather than the metadata 1160. However, these embodiments may provide less security for the PII included in the progress tracking information.

It will be appreciated that receipt of an active context implicitly authorizes the daemon 440 to track progress related to that particular context. Once the context is removed from the active context list 1170, the implicit authorization is withdrawn and, therefore, the daemon does not track the progress associated with that context.

Figure 12:
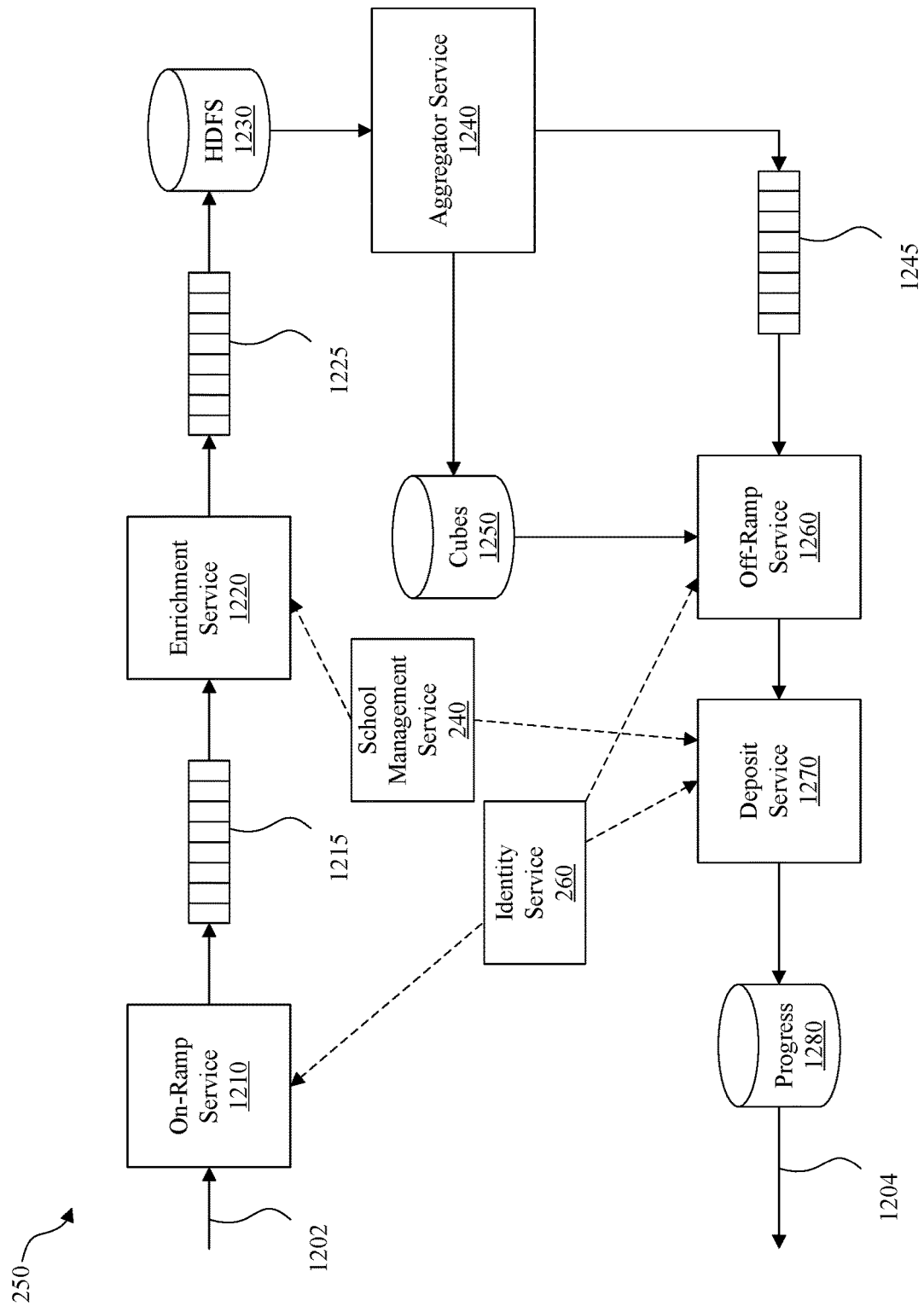
FIG. 12 illustrates the progress pipeline, in accordance with some embodiments.

FIG. 12 illustrates the progress pipeline 250, in accordance with some embodiments. The progress pipeline 250 is implemented on one or more server devices 110. In some embodiments, each component of the progress pipeline 250 is implemented on a different server device 110. In some cases, a particular component of the progress pipeline 250 is implemented on a cluster of server nodes, which may be referred to herein as a cluster.

As shown in FIG. 12, the progress pipeline 250 receives progress tracking metadata 1202 from the daemon(s) 440 included on one or more client devices 120 via a network 150. The progress pipeline 250 can be implemented as one or more services associated with a network address. Messages sent to the network address are processed by the corresponding service.

In some embodiments, the on-ramp service 1210 receives the progress tracking metadata 1202 from one or more daemon(s) 440. The progress tracking metadata 1202 includes information related to the progress tracking information 1150 for a particular student. In some embodiments, the progress tracking metadata 1202 includes a user identifier associated with a user account for the client application 210 and a context identifier for a particular context corresponding with the progress tracking information 1150.

In some embodiments, the on-ramp service 1210 is configured to check whether a progress tracking is enabled for a particular user. An administrator, via the school management service 240, can change a preference for a particular student with regard to authorization to track progress for the given student. The on-ramp service 1210 may receive notice about a change in status of a given student's authorization preference prior to said change being received at the daemon 440 of a particular client device 120. Consequently, the daemon 440 can continue collecting progress tracking information for a given student even after the student has disabled progress tracking, globally. Therefore, the on-ramp service 1210 performs a gate-keeping function for progress tracking metadata received by the progress pipeline 250 based on a set of flags stored in the remote database 460.

In some embodiments, a roster service is configured to periodically pull the set of authorization flags for each student in a particular school district using the school management service 240 and store the set of authorization flags in an authorization zone 465 in the remote database 460, which is scoped to the organization. The on-ramp service 1210 can then query the set of authorization flags for each item of progress tracking metadata 1202 received using a user identifier included in the progress tracking metadata 1202.

In some embodiments, the on-ramp service 1210 calls the identity service 260 and requests a directory service identifier using the user identifier received in the progress tracking metadata 1202. The directory service identifier can be registered as being associated with the user identifier when the user account is created. The directory service identifier is constant for the life of the user account, and is only used within the server-side of the client-server architecture 200 such that the client application 210 and/or daemon 440 never receive the directory service identifier. Consequently, anyone snooping the traffic between the daemon 440 and the progress pipeline 250 cannot acquire the directory service identifier to correlate certain PII stored one or more servers with an identifier for a particular user. The identity service 260 returns the directory service identifier to the on-ramp service 1210, which de-references the user identifier included in the progress tracking metadata 1202 and replaces the user identifier with the directory service identifier. In some embodiments, the set of authorization flags corresponds with directory service identifiers rather than the user identifiers for the user account. Consequently, the user identifier is de-referenced prior to the on-ramp service 1210 performing the gate-keeping function. Once the on-ramp service 1210 has finished processing the progress tracking metadata 1202, the progress tracking metadata 1202 is transmitted to a queue 1215.

In other embodiments, an internal identifier can be utilized instead of the directory service identifier. Therefore, the progress tracking metadata 1202 is tracked throughout the progress pipeline 250 using an internal identifier rather than the directory service identifier. This enables the progress pipeline 250 to sever all associations between progress tracking information and a particular user simply by deleting the association between the internal identifier and the directory service identifier.

In some embodiments, the queue 1215 is a queue service implemented on a server device 110. The queue 1215 can be implemented within a same server device 110 or a different server device 110 as the on-ramp service 1210. In some embodiments, the queue 1215 is implemented as a distributed streaming service, such as the Apache® Kafka distributed streaming platform. The queue 1215 enables the on-ramp service 1210 and the enrichment service 1220 to run asynchronously.

In some embodiments, the enrichment service 1220 is implemented on one or more server devices 110. The enrichment service 1220 is configured to receive the progress tracking metadata 1202 from the queue 1215, and enrich the progress tracking metadata 1202 with additional information. In some embodiments, the enrichment service 1220 requests roster data from the school management service 240 based on the directory service identifier included in the progress tracking metadata 1202. The roster data can include one or more class identifiers for any classes in which the student is enrolled as well as a list of student identifiers for the students enrolled in each class. The school management service 240 can utilize the directory service identifier for the student rather than the user identifier provided by the daemon 440 within the raw progress tracking metadata 1202. In other embodiments, the user identifier can be utilized to query the school management service 240 rather than the internal identifier.

The enrichment service 1220 can also retrieve all active hand-outs for a particular class from a corresponding zone 465 in the remote database 460. The roster data and the hand-outs are cross-referenced with the class identifier and the directory service identifier included in the progress tracking metadata 1202 in order to append additional information to the progress tracking metadata 1202, if not already included in the progress tracking metadata 1202. In some embodiments, the enrichment service 1220 ensures that the progress tracking metadata 1202 includes: an organization identifier, a class identifier, a hand-out identifier, and a context identifier, as well as the reference to the encrypted progress tracking information 1150.

In some embodiments, the progress tracking metadata 1202 can be associated with multiple class identifiers and/or multiple hand-out identifiers. For example, if two different instructors from two different classes assign an activity to a particular student in two different hand-outs that references the same context, then the student, when completing the activity for one class, will also simultaneously be credited with completing the same activity for the other class. Once the enrichment service 1220 has enriched the progress tracking metadata 1202, the enrichment service 1220 transmits the enriched progress tracking metadata 1202 to a queue 1225.

In some embodiments, the queue 1225 is similar to the queue 1215. The queue 1225 can be implemented within a same server device 110 or a different server device 110 as the enrichment service 1220.

In some embodiments, the progress tracking metadata 1202 is popped from the queue 1225 and stored in a distributed file system 1230. In some embodiments, the distributed file system 1230 is the Apache® Hadoop Distributed File System (HDFS) as implemented on a cluster of server nodes. Each server node includes a set of inexpensive disk drives on which data can be stored. In some events, the distributed file system 1230 includes at least one journal node, which is configured to track changes to the progress tracking metadata 1202 stored in the distributed file system 1230. The journal node protects the integrity of the progress tracking metadata 1202 in case of server node crashes.

It will be appreciated that the progress pipeline 250 can be utilized by multiple organizations, even though data for each organization is stored in separate and distinct remote databases 460 limited in scope to a particular organization. Consequently, the distributed file system 1230 is storing a large volume of progress tracking metadata 1202 for one or more organizations. The aggregator service 1240 is designed to sort through all of the progress tracking metadata 1202 and organize the progress tracking metadata 1202 received during a tracking window by organization. In some embodiments, the aggregator service 1240 is a compute service for processing large scale datasets. For example, the aggregator service 1240 can be implemented as, but is not limited to, an Apache® Spark service implemented on a cluster of server nodes. The progress tracking metadata 1202 are then processed in one or more spark jobs generated by the aggregator service 1240.

In some embodiments, the tracking window can be, e.g., a number of minutes or hours. For example, the aggregator service 1240 can sort progress tracking metadata 1202 received at the distributed file system 1230 over a ten minute window. In some embodiments, the aggregator service 1240 is configured to run a routine at the expiration of a timer set based on the tracking window. Once the routine is run, the timer is reset to wait for the expiration of the next tracking window.

In some embodiments, the aggregator service 1240 consults the journal node(s) of the distributed file system 1230 to collect information related to all of the progress tracking metadata 1202 stored in the distributed file system 1230 during the tracking window. The journal node tracks changes to the distributed file system 1230 and can return a list of all progress tracking metadata 1202 that has been stored in the distributed file system 1230 over the previous tracking window. The aggregator service 1240 is configured to pull the progress tracking metadata 1202 received during the tracking window and generate data structures for each organization in one or more organizations that submit progress tracking metadata 1202 to the progress pipeline 250 during the tracking window. The data structures can be referred to herein as cubes.

In some embodiments, the aggregator service 1240 generates a separate and distinct cube scoped to a single organization. All of the progress tracking metadata 1202 corresponding to a particular organization identifier is sorted into a corresponding cube. The progress tracking metadata 1202 stored in a given cube can be sorted by class identifier, hand-out identifier, context identifier, and student identifier (e.g., user identifier, directory service identifier, or the like).

In some embodiments, the cubes are stored in block storage 1250. In some embodiments the block storage 1250 can be a HDD included in the server device 110 that implements the aggregator service 1240. In other embodiments, the block storage 1250 can be a virtual block storage device implemented on a set of one or more physical storage devices included in one or more server devices 110. In other embodiments, the block storage 1250 can be replaced by a distributed database service such as Apache® Cassandra implemented on a cluster of server nodes. In yet other embodiments, the block storage 1250 can be replaced by a distributed file system similar to the distributed file system 1230, described above.

The aggregator service 1240 generates one or more cubes that include the progress tracking metadata 1202 received during the tracking window for one or more corresponding organizations. The aggregator service 1240 adds a reference to each cube to the queue 1245. In some embodiments, the queue 1245 is similar to queues 1215 and 1225, and enables the off-ramp service 1260 to operate asynchronously from the aggregator service 1240.

In some embodiments, the off-ramp service 1260 is configured to process the cubes as each cube reference is popped from the queue 1245. In some embodiments, the off-ramp service 1260 is merely configured to read the progress tracking metadata 1202 stored in a given cube in the block storage 1250 and write each progress tracking metadata 1202 entry to a particular zone 465 in the remote database 460 scoped to a particular class, context, and, optionally, student based off the class identifier, context identifier, and/or directory service identifier/user identifier included in the progress tracking metadata 1202. Consequently, the off-ramp service 1260 sorts the progress tracking metadata 1202 into smaller granularity than the cubes.

In other embodiments, the off-ramp service 1260 de-references the progress tracking metadata 1202 by replacing the directory service identity utilized by prior services in the progress pipeline 250 and replaces the directory service identifier with a progress identifier. The progress identifier can be associated with the directory service identifier within the identity service 260; however, the progress identifier can be disassociated from the directory service identifier to break any connection between progress tracking data 1150 and a particular user. In some embodiments, the progress identifier is discarded in response to a user opting out of the progress tracking (e.g., disabling progress tracking globally). For example, an administrator for an organization can disable progress tracking for particular students, classes, schools, and/or the entire school district using the school management service 240. These changes can cause the identity service 260 to disassociate progress identifiers from directory service identifiers for those students that have disabled progress tracking. Even though the progress tracking information may still exist in the remote database 460, the progress tracking information cannot be correlated with a particular student once the association between progress identifiers and directory service identifiers has been broken.

Once the off-ramp service 1260 has finished processing the progress tracking metadata 1202, the progress tracking metadata 1202 is transmitted to the deposit service 1270. In some embodiments, the deposit service 1270 is implemented on at least one server device 110. The deposit service 1270 is configured to pull the encrypted progress tracking information 1150 reference by a progress tracking metadata 1202 entry and store the progress tracking information 1150 in progress storage 1280. In some embodiments, the progress storage 1280 is a network-based storage service. The progress tracking information 1150 is stored in zones, similar to zones 465, scoped to a particular class identifier, context identifier, progress identifier, and (optionally) a hand-out identifier.

In some embodiments, the progress storage 1280 is separate and distinct from the remote database 460 and can only be accessed on the server-side of the client-server architecture 200. Thus, daemon 440 does not have direct visibility into the progress tracking information 1150 that has been archived by the progress pipeline 250. In other embodiments, the progress storage 1280 can be implemented in new zones 465 in the remote database 460 and synced to client devices 120 using a report service 270.

Although not shown explicitly, various services in the progress pipeline 250 can be configured to recycle particular progress tracking metadata 1202 being processed by the service if certain problems are encountered during processing. In some embodiments, a retry queue is associated with each service and the progress tracking metadata 1202 can be pushed into the retry queue to process at a later time. For example, a service such as the identity service 260 can be experiencing downtime which prevents the progress pipeline 250 from completing a particular operation. In such cases, the data being processed by the service can be stored in the retry queue in order to attempt the processing at a later time when the down service may be available. Alternately, the service can simply be configured to add the progress tracking metadata 1202 back into the queue that is interfaced with an input of the service. For example, the enrichment service 1220 can be configured to push progress tracking metadata 1202 back onto the queue 1215 to be processed at a later point in time.

A report service 270 can then pull progress tracking information 1204 from the progress storage 1280 in response to a request from the client application 210 and/or daemon 440 to generate report data provided to the client application 210 and/or daemon 440.

Figure 13:
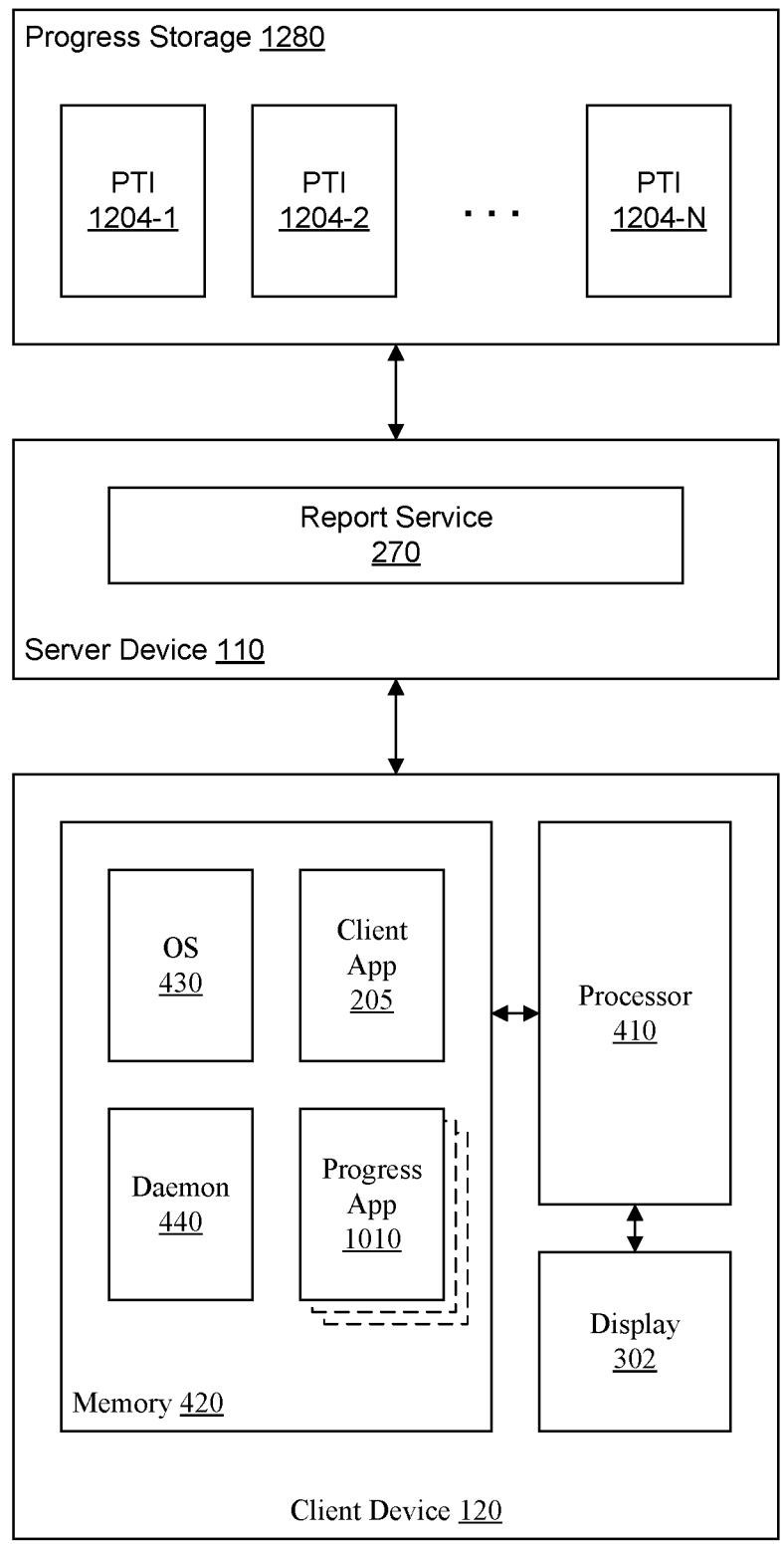
FIG. 13 illustrates a client-server relationship between the report service and a client application and/or daemon, in accordance with some embodiments.

FIG. 13 illustrates a client-server relationship between the report service 270 and a client application 210 and/or daemon 440, in accordance with some embodiments. The client application 210 and/or daemon 440 included in a client device 120 interfaces with the report service 270 in a server device 110. After a hand-out is assigned to a class of students, the instructor may wish to track a progress of students completing the assignment. More specifically, a GUI in the client application 210 can display a representation of progress tracking information related to a particular hand-out. Each of the attachments, hand-ins and/or activities, can be displayed along with information related to the progress of completion for each of the students.

In some embodiments, the client application 210 receives input to display a representation of a hand-out on a display 302 of the client device 120. Responsive to the input, the client application 210 requests a report from the report service 270. As used herein, a report can refer to a file or data structure that includes report data derived from the progress tracking information 1204 pulled from the progress storage 1280.

In some embodiments, the report service 270 receives a request for a report from the client application 210. The request can include a class identifier, context identifier, user identifier, and (optionally) hand-out identifier. The report service 270 can utilize the identity service 260 to find a progress identifier corresponding to the user identifier, and then query the progress storage 1280 to retrieve progress tracking information 1204 corresponding to the class identifier, context identifier, progress identifier, and (optionally) hand-out identifier.

In addition the request can specify a time frame associated with the request. For example, the request can specify whether the query should limit the progress tracking information to a time before the due date for the hand-out, a time after the due date for the hand-out, or a time up to and including a closing date for the hand-out. As used herein, a closing date can refer to a time at which the context attached to the hand-out is de-activated, thereby blocking further progress tracking related to that context after the closing date unless another hand-out is assigned to the student that includes said context. Consequently, the report service 270 generates a set of progress tracking information 1204 that corresponds to a student in a particular class and for a particular context assigned in a particular hand-out.

In some embodiments, the daemon 440 aggregates the progress tracking information 1204 for a class to calculate various statistics for the class based on the report data. For example, the daemon 440 can calculate a total number of students in the class, and a total number of students that have completed the hand-in or activity. The daemon 440 can also use time stamps associated with the different progress tracking information 1204 to calculate a total time for each student to complete the hand-in or activity (e.g., by calculating a difference between a first time stamp and a last time stamp for all progress tracking information for a particular activity or hand-in). As another example, the daemon 440 can calculate scores for each student based on correct/incorrect responses provided on a quiz or problem set. The daemon 440 can calculate a ratio of passing scores to failing scores, a ratio of the number of students with passing scores to total students in the class or the number of students with failing scores, an average score for the class, a minimum score and a maximum score for the class, a median score and a standard distribution of the collection of scores, a distribution of scores mapped to letter grades (e.g., a number of A scores, a number of B scores, and so on), and any other relevant statistics related to scores and/or the progress tracking information 1204.

In some embodiments, a student can make a number of attempts to complete a particular activity. For example, a student could take a quiz a number of times. In such embodiments, the request for the report can specify whether the report data should include progress tracking information 1204 for each attempt completed by the student or only the last attempt completed by the student. If the progress tracking information includes data for multiple attempts, then the daemon 440 can be configured to calculate statistics related to the multiple attempts such as an average score, a top score of all attempts, a ratio of passing attempts to failed attempts, etc.

In some embodiments, the daemon 440 can also be configured to download roster information from a roster zone 465 in the remote database 460 in order to correlate a user identifier associated with the progress tracking information with a student name, for example.

In other embodiments, the client application 210 is configured to perform the functionality of aggregating the progress tracking information 1204 and/or calculating statistics related to the progress tracking information 1204 in the local database 450. The daemon 440 merely facilitates downloading the progress tracking information 1204 from the zone 465 in the remote database 460 to the local database 450 to allow the client application 210 to access the progress tracking information 1204. The client application 210 is then configured to perform any necessary analysis using the progress tracking information 1204 in order to generate values to populate in fields of a GUI presented to the instructor.

Figure 14A:
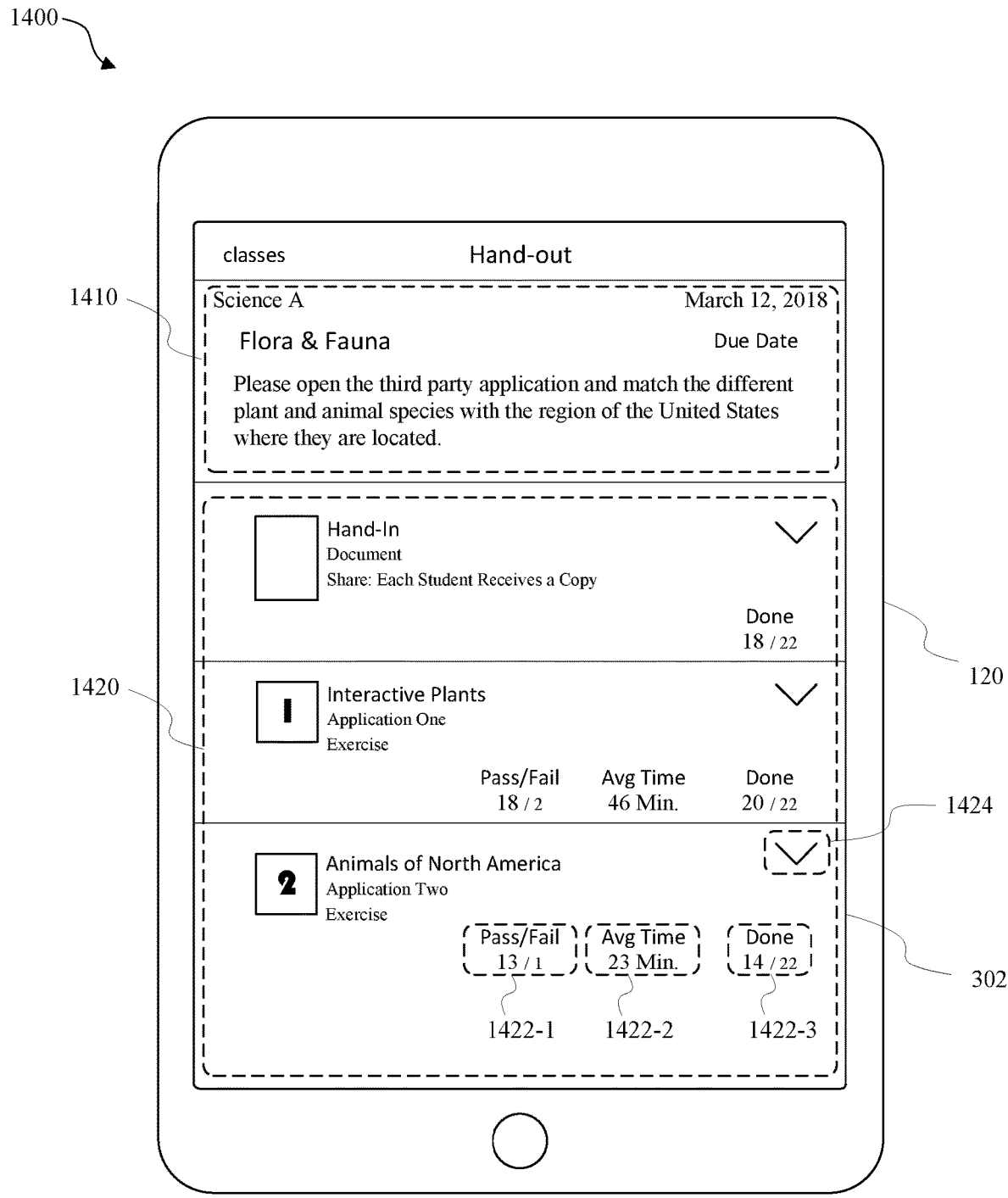
FIGS. 14A-14B illustrate a graphical user interface of the client application, in accordance with some embodiments.
Figure 14B:
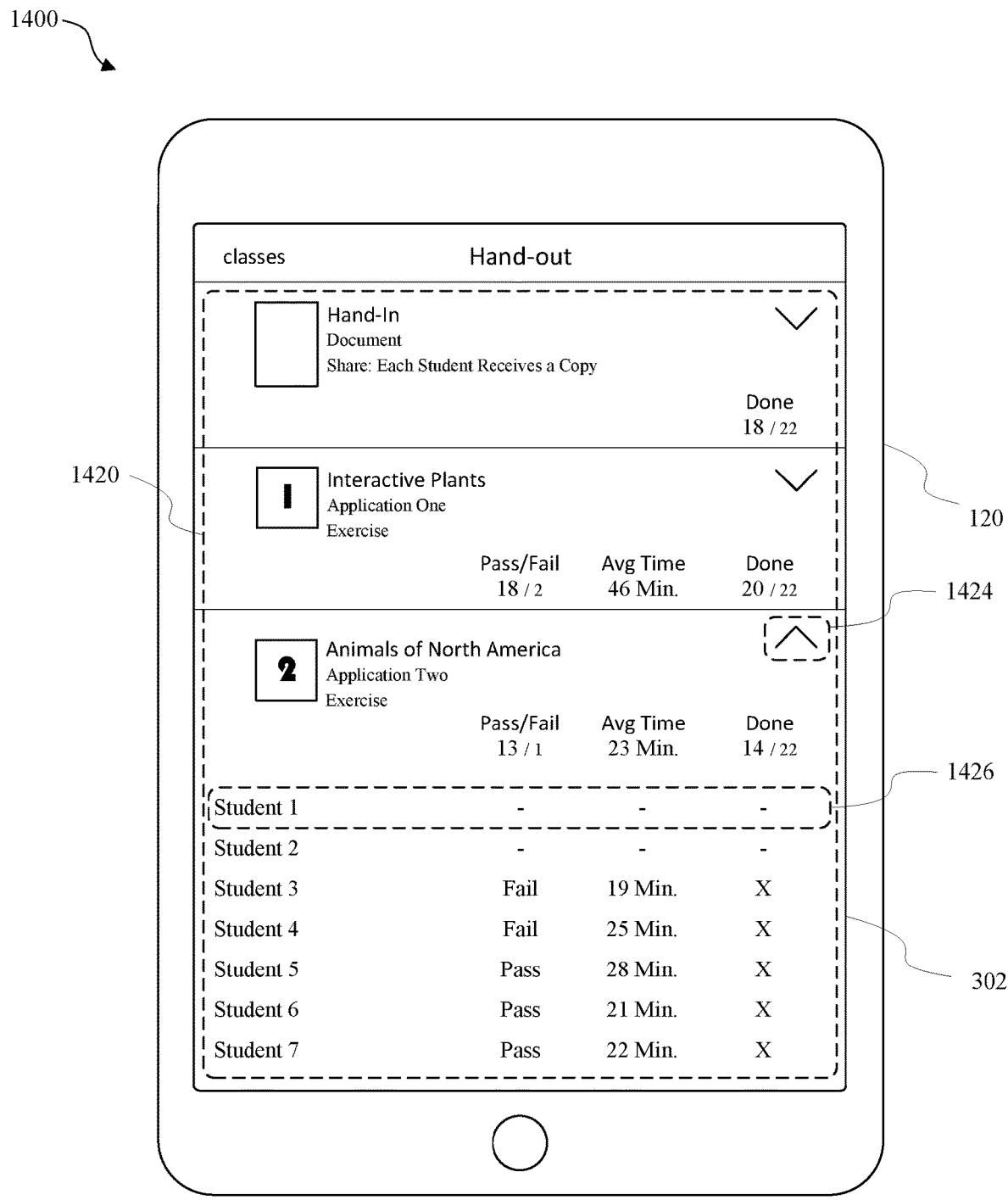

FIGS. 14A-14B illustrate a GUI 1400 of the client application 210, in accordance with some embodiments. The GUI 1400 can be used to present report data related to an assigned hand-out to an instructor. The GUI 1400 can be presented on a display 302 of the client device 120. As shown in FIG. 14A, the GUI 1400 is displayed on a tablet computer such as client device 120-2. The GUI 1400 can include a number of elements including graphics, text, icons, shapes, input fields, display regions, etc. In some embodiments, the GUI 1400 is displayed in response to an instructor selecting an element 312 for an assigned hand-out in the GUI 300.

The GUI 1400 includes a first display region 1410 and a second display region 1420. The first display region 1410 presents information included in the hand-out such as a title of the hand-out, a due date for the hand-out, an indication of the class in which the hand-out is assigned, and instructions included in the hand-out by the instructor. A second display region 1420 presents information related to any hand-ins and/or activities that were attached to the hand-out by the instructor.

Each hand-in or activity attached to the hand-out and presented in the second display region 1420 can also be presented with report data related to the hand-in or activity. Report data can be displayed within one or more elements 1422. For example, as shown in FIG. 14A, an activity associated with application two includes: a first element 1422-1 that displays a ratio of passing scores to failing scores for students that have completed the activity; a second element 1422-2 that displays an average time for the students to complete the activity; and a third element 1422-3 displays a ratio of the number of students that have completed the activity to the total number of students in the class.

In addition, an icon 1424 is presented proximate the hand-in or activity that enables the instructor to view more detailed information pertaining to the report data. As shown in FIG. 14B, selecting the icon 1424 can cause the GUI 1400 to be updated to display detailed information in the second display region 1420 proximate the hand-in or activity. It will be appreciated that the second display region 1420 can automatically be adjusted to cover the pixels in the display 302 previously covered by both the first display region 1410 and the second display region 1420. Of course, the extents of the second display region 1420 can remain the same as in FIG. 14A or be updated manually in response to a touch input gesture that relocates the first display region 1410 and/or the second display region 1420 up or down relative to the pixels of the display 302. For example, a swipe gesture can be utilized to scroll the first display region 1410 and/or the second display region 1420 up or down.

As shown in FIG. 14B, report data related to each individual student enrolled in the class can be presented in the GUI 1400. For example, an entry 1426 of the detailed information includes a student name, an indication of whether the student passed or failed the activity, if completed, a time for each student to complete the activity in the third-party application, and an indication of whether the activity has been completed. It will be appreciated that the information shown in FIG. 14B is merely one example of the type of detailed information that can be presented in the GUI 1400. In other embodiments, the detailed information can include other types of statistics or raw progress tracking information (e.g., a breakdown of each action that was tracked by the daemon 440 with a time the action was received by the daemon 440 and information related to the action). In yet other embodiments, the detailed information can include graphical representations of the report data, such as graphs or charts that show a student's progress over time, links to the answers to a set of problems submitted by the student, links to the hand-in or a recording of the activity performed by the student, and so forth.

In some embodiments, the detailed information can present a detailed breakdown of progress tracking information for subsections of a particular context. For example, a context can describe the structure of a set of problems assigned to the student. The progress tracking information can include information related to an answer the student provided to each problem in the set of problems. Thus, even though the answers to the set of problems is considered a parent context, child contexts for each problem in the set of problems can track answers to each individual question provided by a student. Thus, the detailed information can enable an instructor to view the specific answers given to each problem and whether the answer was correct or incorrect. The GUI 1400 can enable such visual representations of the progress tracking data to be easily viewed by the instructor.

In some embodiments, the client application 210 can output a result of the report data to a file or data structure to be archived for subsequent review by, e.g., the instructor and or an administrator when determining final grades for each student in the class.

Figure 15:
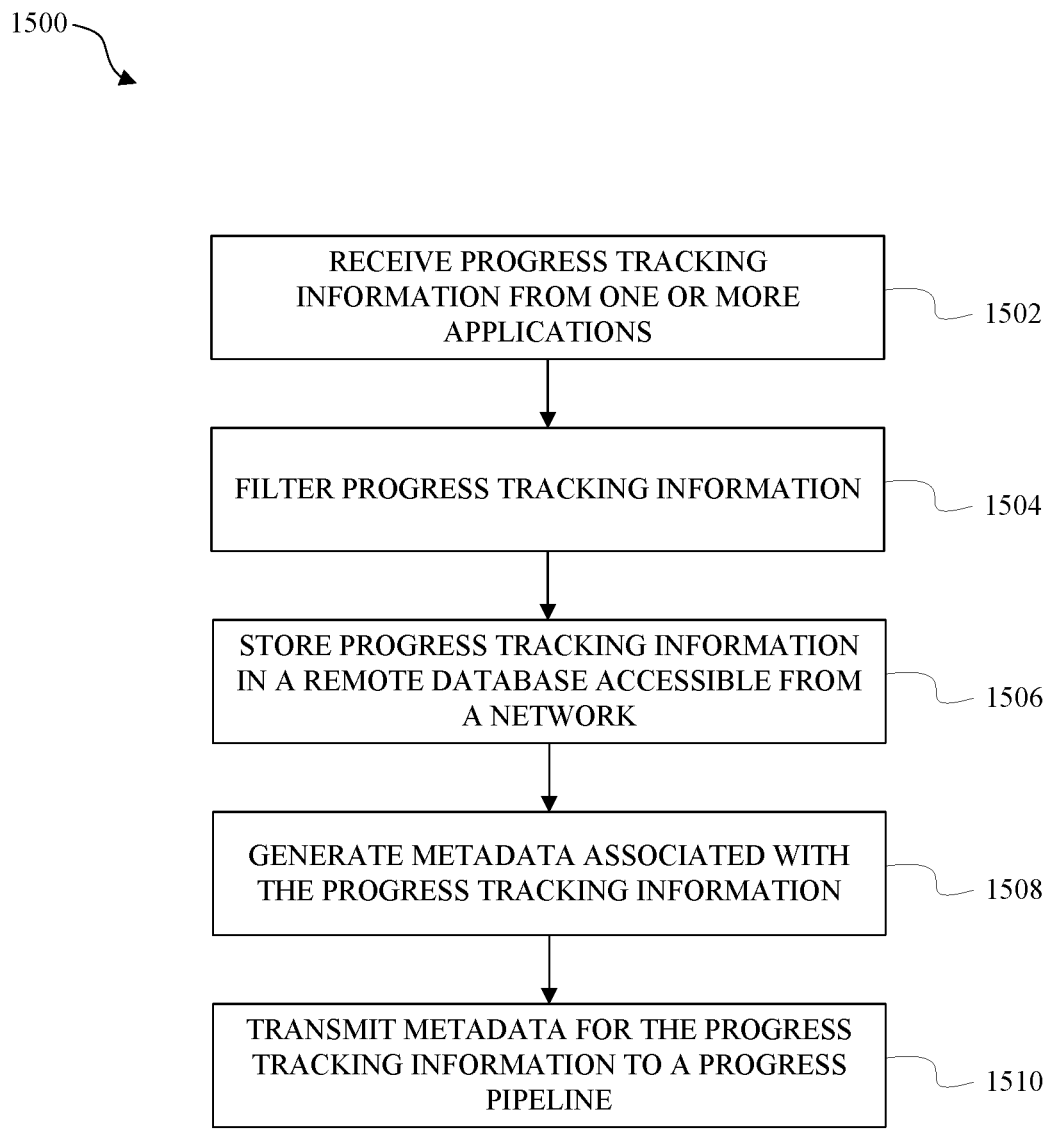
FIG. 15 is a flow chart of a method for tracking student activity on a client device, in accordance with some embodiments.

FIG. 15 is a flow chart of a method 1500 for tracking student activity on a client device, in accordance with some embodiments. The method 1500 is carried out by a client device 120. In some embodiments, the method 1500 can be implemented as logic configured to monitor activity associated with one or more applications. The logic can include instructions, executed by a processor 410 of the client device 120, for monitoring progress of a student to complete activities attached to a resource for a hand-out. In some embodiments, the method 1500 is implemented within logic implemented by daemon 440.

At 1502, progress tracking information is received from one or more applications. In some embodiments, the progress tracking information includes at least one of an application identifier corresponding to the application that generated the progress tracking information, a context identifier corresponding to a particular context associated with the application, a time stamp indicating a time that the progress tracking information was generated, or information indicating an operation that was performed within the application and/or a result of the operation. In some embodiments, the progress tracking information is received by a daemon within an API call generated by the application.

At 1504, the progress tracking information is filtered. In some embodiments, progress tracking information is filtered based on a determination of whether progress tracking is enabled or disabled for each of one or more applications installed on the client device. The progress tracking information is discarded when the progress tracking information is received from any applications for which progress tracking is disabled, and the progress tracking information is processed when the progress tracking information is received from any applications for which progress tracking is enabled. In other embodiments, a list of active contexts associated with one or more applications is received, and the progress tracking information is compared against the list of active contexts. For example, a context identifier included in the progress tracking information is compared with a number of context identifiers included in the list of active contexts. The progress tracking information is discarded when the progress tracking information corresponds with a context that is not included in the list of active contexts, and the progress tracking information is processed when the progress tracking information corresponds with a context that is included in the list of active contexts.

At 1506, the progress tracking information is stored in a remote database accessible from a network. In some embodiments, the remote database is a network-based storage service employing different zones to store different types of data limited to a particular scope. Each zone storing progress tracking information can be protected with a disk-based encryption, and access to the data can be limited to trusted servers using authentication and message signing techniques. The progress tracking information can be stored in a personal zone within the network-based storage service, the personal zone associated with a particular user identifier for a user account associated with a client application installed on the client device.

At 1508, metadata associated with the progress tracking information is generated. The metadata can include a subset of information in the progress tracking information, such as a user identifier and/or a context identifier as well as information such as a reference to the progress tracking information stored in the remote database 460.

At 1510, the metadata for the progress tracking information is transmitted to a progress pipeline. In some embodiments the progress pipeline enhances and aggregates progress tracking information received from a plurality of different client devices associated with a plurality of different students in one or more classes among one or more organizations. The progress pipeline can include a number of services implemented on a number of different server devices.

Figure 16:
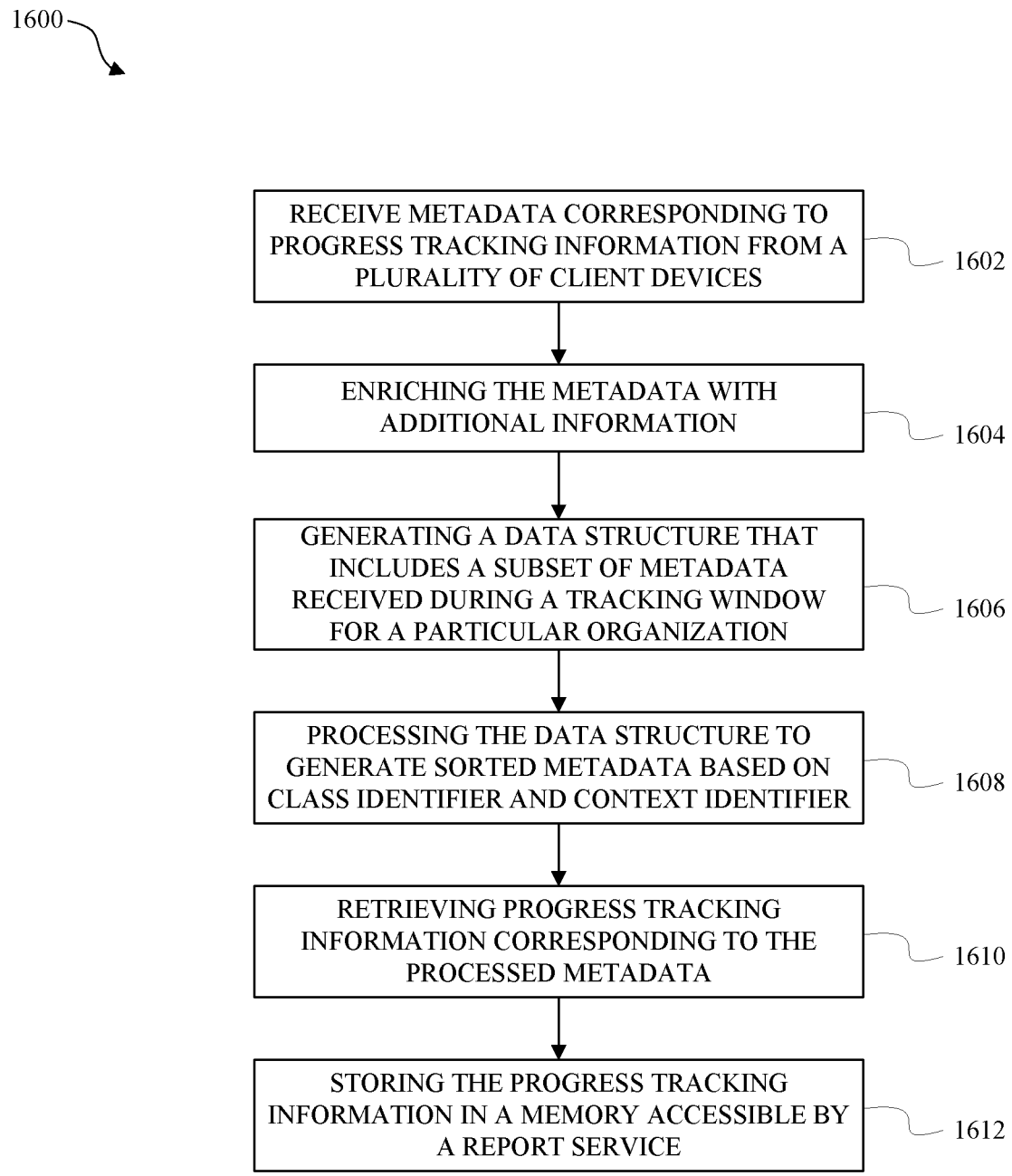
FIG. 16 is a flow chart of a method for processing progress tracking information utilizing one or more services available over a network, in accordance with some embodiments.

FIG. 16 is a flow chart of a method 1600 for processing progress tracking information utilizing one or more services available over a network, in accordance with some embodiments. The method 1600 is carried out by the progress pipeline 250. In some embodiments, the method 1600 can be implemented as logic configured to process at least one of progress tracking information or metadata corresponding to the progress tracking information. The logic can include instructions, executed by a processor 410 of the server device 110, for processing the progress tracking information and/or metadata. In some embodiments, the method 1600 is implemented within logic implemented by one or more services including an on-ramp service 1210, an enrichment service 1220, a distributed file system 1230, an aggregator service 1240, an off-ramp service 1260, and a deposit service 1270.

At 1602, metadata corresponding to progress tracking information is received from a plurality of client devices. In some embodiments, the metadata can include a reference to progress tracking information stored in a remote database. The metadata can also include at least one of a class identifier, a user identifier, or a context identifier corresponding to the progress tracking information.

At 1604, the metadata is enriched with additional information. In some embodiments, the metadata, supplemented by the additional data, correlates the progress tracking information with an organization identifier, a class identifier, a directory service identifier, a context identifier, and, optionally, a hand-out identifier.

At 1606, a data structure is generated that includes a subset of metadata received by the progress pipeline during a tracking window for a particular organization. In some embodiments, a distributed file system utilizes at least one journal node, which enables all of the metadata received during a tracking window to be retrieved from the distributed file system. A service sorts the metadata into different data structures corresponding to each of one or more organizations that submitted metadata to the progress pipeline during the tracking window.

At 1608, the data structure is processed to generate sorted metadata based on the class identifier and/or the context identifier. The sorting can also be based on a directory service identifier or an internal identifier. The operation at 1608 can be performed for each data structure created for the one or more organizations.

At 1610, progress tracking information corresponding to the sorted metadata is retrieved from the remote database. The references included in the metadata can be utilized to request the progress tracking information from the remote database.

At 1612, the progress tracking information is stored in a memory accessible by a report service. In some embodiments, the progress tracking information is de-referenced from the directory service identifier or internal identifier and a progress identifier replaces the directory service identifier or internal identifier in the metadata associated with the progress tracking information. The progress identifier and progress tracking information can be stored in a network-based storage service that is accessible by a report service. The network-based storage service may not be accessible by a client device except, indirectly, through the report service.

Figure 17:
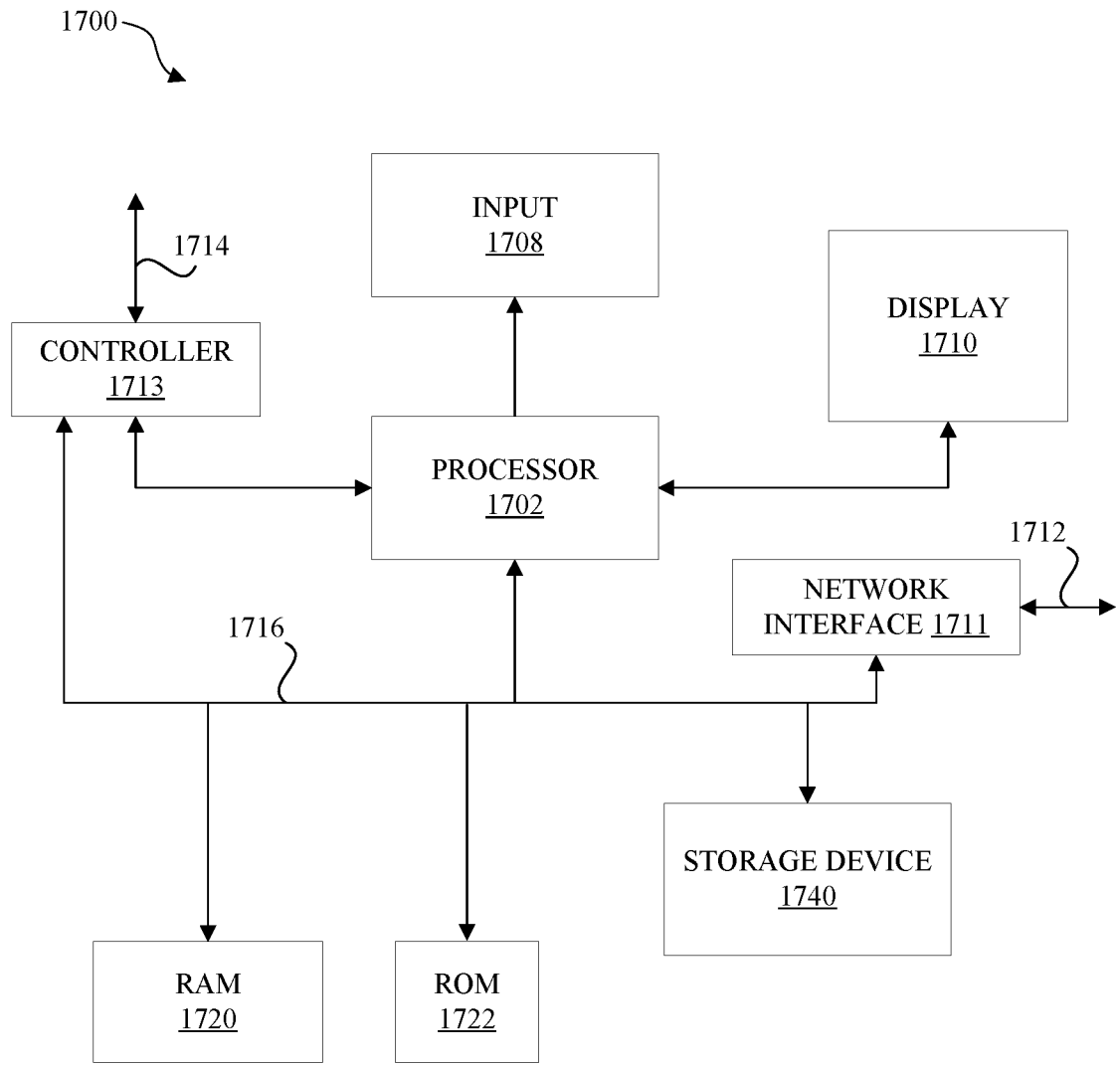
FIG. 17 illustrates a detailed view of an exemplary computing device that can be used to implement the various apparatus and/or methods described herein, in accordance with some embodiments.

FIG. 17 illustrates a detailed view of an exemplary computing device 1700 that can be used to implement the various apparatus and/or methods described herein, in accordance with some embodiments. In particular, the detailed view illustrates various components that can be included in the computing devices illustrated in FIGS. 1 to 14 and/or described herein. For example, one or more of the server devices(s) 110, client device(s) 120, or any other device including any network devices and/or consumer electronics can include the components of computing device 1700.

As shown in FIG. 17, the computing device 1700 can include a processor 1702 that represents a microprocessor or controller for controlling the overall operation of computing device 1700. The computing device 1700 can also include a user input device 1708 that allows a user of the computing device 1700 to interact with the computing device 1700. For example, the user input device 1708 can take a variety of forms, such as a button, keypad, dial, touch screen, audio input interface, visual/image capture input interface, input in the form of sensor data, etc. Still further, the computing device 1700 can include a display 1710 (screen display) that can be controlled by the processor 1702 to present visual information to the user. A data bus 1716 can facilitate data transfer between at least a storage device 1740, the processor 1702, and a controller 1713. The controller 1713 can be used to interface with and control different equipment through an equipment control bus 1714. The computing device 1700 can also include a network/bus interface 1711 that couples to a data link 1712. In the case of a wireless connection, the network/bus interface 1711 can include a wireless transceiver.

The computing device 1700 also include a storage device 1740, which can comprise a single disk or a plurality of disks (e.g., hard drives), and includes a storage management module that manages one or more partitions within the storage device 1740. In some embodiments, storage device 1740 can include flash memory, semiconductor (solid state) memory or the like. The computing device 1700 can also include a Random Access Memory (RAM) 1720 and a Read-Only Memory (ROM) 1722. The ROM 1722 can store programs, utilities or processes to be executed in a non-volatile manner. The RAM 1720 can provide volatile data storage, and stores instructions related to the operation of the computing device 1700.

As described above, one aspect of the present technology is the gathering and use of data available from various sources to track progress of students at completing assignments. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the instructional experience of individuals attending a school. Accordingly, use of such personal information data enables instructors to tailor their lessons or individual attention to students' needs. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of progress tracking services, the present technology can be configured to allow users to select to "opt in" or "opt out" of participation in the collection of personal information data during registration for services or anytime thereafter. In another example, users can select not to provide progress tracking information for specific third-party applications. In yet another example, users can select to limit the scope of data that is collected or entirely prohibit the collection of progress tracking information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, progress tracking can be implemented based on non-personal information data or a bare minimum amount of personal information, such as other non-personal information available to the progress tracking pipeline, or publicly available information.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for tracking student activity on a client device, the method comprising, by a background process executing on the client device:
    receiving, from each application of a plurality of applications executing on the client device, one or more respective contexts that define respective structures of progress tracking information to be provided by the application in relation to student activities performed within the application, wherein each respective context is associated with a respective unique context identifier (ID);
    storing the respective contexts into a collection of contexts;
    receiving, from a management entity, an assignment of at least one activity to be performed within at least one application of the plurality of applications, wherein the at least one activity is specified in accordance with the respective structure of at least one of the contexts in the collection of contexts;
    receiving progress tracking information from an application of the plurality of applications, wherein the progress tracking information corresponds to the at least one activity and includes one or more unique context IDs;
    identifying, within the collection of contexts, one or more respective contexts that correspond to the one or more unique context IDs;
    utilizing the one or more respective contexts to interpret and filter the progress tracking information to generate filtered progress tracking information;
    storing the filtered progress tracking information into a remote database;
    generating metadata associated with the filtered progress tracking information; and
    transmitting the metadata to at least one service accessible by the client device over a network.

2. The method of claim 1, wherein each application of the plurality of applications implements at least a portion of a software framework shared by the background process.

3. The method of claim 1, wherein filtering the progress tracking information comprises:
    determining whether progress tracking is enabled or disabled for each application of the plurality of applications; and
    discarding the progress tracking information when the progress tracking information is received from any applications for which progress tracking is disabled, or processing the progress tracking information when the progress tracking information is received from any applications for which progress tracking is enabled to generate the filtered progress tracking information.

4. The method of claim 1, wherein, for a given application of the plurality of applications, the one or more respective contexts are defined by a respective developer of the given application.

5. The method of claim 1, wherein the progress tracking information stored in the remote database is secured using disk encryption for each zone in the remote database.

6. The method of claim 1, wherein the remote database is a network-based storage service apportioned into a plurality of zones storing different data, and each zone is limited in scope to any combination of at least one of an organization identifier, a class identifier, a user identifier, a unique context ID, or a hand-out identifier.

7. The method of claim 6, wherein the progress tracking information is stored in a personal zone within the network-based storage service, the personal zone associated with a particular user identifier for a user account associated with a client application installed on the client device.

8. The method of claim 1, wherein the metadata includes a reference to the progress tracking information in the remote database as well as at least one of a class identifier, a user identifier, or one or more unique context IDs.

9. The method of claim 8, wherein the one or more unique context IDs are included in the metadata.

10. A non-transitory computer readable storage medium configured to store instructions that, when executed by a processor included in a client device, cause the client device to implement a background process for tracking student activity on the client device, wherein the background process is configured to carry out steps that include:
- receiving, from each application of a plurality of applications executing on the client device, one or more respective contexts that define respective structures of progress tracking information to be provided by the application in relation to student activities performed within the application, wherein each respective context is associated with a respective unique context identifier (ID);
- storing the respective contexts into a collection of contexts;
- receiving, from a management entity, an assignment of at least one activity to be performed within at least one application of the plurality of applications, wherein the at least one activity is specified in accordance with the respective structure of at least one of the contexts in the collection of contexts;
- receiving progress tracking information from an application of the plurality of applications, wherein the progress tracking information corresponds to the at least one activity and includes one or more unique context IDs;
- identifying, within the collection of contexts, one or more respective contexts that correspond to the one or more unique context IDs;
- utilizing the one or more respective contexts to interpret and filter the progress tracking information to generate filtered progress tracking information;
- storing the filtered progress tracking information into a remote database;
- generating metadata associated with the filtered progress tracking information; and
- transmitting the metadata to at least one service accessible by the client device over a network.

11. The non-transitory computer readable storage medium of claim 10, wherein each application of the plurality of applications implements at least a portion of a software framework shared by the background process.

12. The non-transitory computer readable storage medium of claim 10, wherein filtering the progress tracking information comprises:
- determining whether progress tracking is enabled or disabled for each application of the plurality of applications; and
- discarding the progress tracking information when the progress tracking information is received from any applications for which progress tracking is disabled, or processing the progress tracking information when the progress tracking information is received from any applications for which progress tracking is enabled to generate the filtered progress tracking information.

13. The non-transitory computer readable storage medium of claim 10, wherein, for a given application of the plurality of applications, the one or more respective contexts are defined by a respective developer of the given application.

14. The non-transitory computer readable storage medium of claim 10, wherein the progress tracking information stored in the remote database is secured using disk encryption for each zone in the remote database.

15. The non-transitory computer readable storage medium of claim 10, wherein the remote database is a network-based storage service apportioned into a plurality of zones storing different data, and each zone is limited in scope to any combination of at least one of an organization identifier, a class identifier, a user identifier, a unique context ID, or a hand-out identifier.

16. A client device, comprising:
at least one processor; and
at least one memory storing instructions that, when executed by the at least one processor, cause the client device to implement a background process for tracking student activity on the client device, wherein the background process is configured to carry out steps that include:
- receiving, from each application of a plurality of applications executing on the client device, one or more respective contexts that define respective structures of progress tracking information to be provided by the application in relation to student activities performed within the application, wherein each respective context is associated with a respective unique context identifier (ID);
- storing the respective contexts into a collection of contexts;
- receiving, from a management entity, an assignment of at least one activity to be performed within at least one application of the plurality of applications, wherein the at least one activity is specified in accordance with the respective structure of at least one of the contexts in the collection of contexts;
- receiving progress tracking information from an application of the plurality of applications, wherein the progress tracking information corresponds to the at least one activity and includes one or more unique context IDs;
- identifying, within the collection of contexts, one or more respective contexts that correspond to the one or more unique context IDs;
- utilizing the one or more respective contexts to interpret and filter the progress tracking information to generate filtered progress tracking information;

storing the filtered progress tracking information into a remote database;

generating metadata associated with the filtered progress tracking information; and transmitting the metadata to at least one service accessible by the client device over a network.

17. The client device of claim 16, wherein each application of the plurality of applications implements at least a portion of a software framework shared by the background process.

18. The client device of claim 16, wherein filtering the progress tracking information comprises:

determining whether progress tracking is enabled or disabled for each application of the plurality of applications; and discarding the progress tracking information when the progress tracking information is received from any applications for which progress tracking is disabled, or processing the progress tracking information when the progress tracking information is received from any applications for which progress tracking is enabled to generate the filtered progress tracking information.

19. The client device of claim 16, wherein, for a given application of the plurality of applications, the one or more respective contexts are defined by a respective developer of the given application.

20. The client device of claim 16, wherein the progress tracking information stored in the remote database is secured using disk encryption for each zone in the remote database.

\* \* \* \* \*